United States Patent
Tamura et al.

(10) Patent No.: US 9,447,261 B2
(45) Date of Patent: Sep. 20, 2016

(54) CELLULOSE ACYLATE FILM, POLARIZING PLATE AND LIQUID CRYSTAL DISPLAY DEVICE

(71) Applicant: FUJIFILM Corporation, Tokyo (JP)

(72) Inventors: Akio Tamura, Kanagawa (JP); Yu Naito, Kanagawa (JP); Yutaka Nozoe, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 135 days.

(21) Appl. No.: 14/227,386

(22) Filed: Mar. 27, 2014

(65) Prior Publication Data
US 2014/0199502 A1    Jul. 17, 2014

Related U.S. Application Data

(63) Continuation of application No. PCT/JP2012/075254, filed on Sep. 28, 2012.

(30) Foreign Application Priority Data

Sep. 30, 2011  (JP) ................. 2011-216235
Jan. 24, 2012  (JP) ................. 2012-012008

(51) Int. Cl.
    *C09K 19/00*    (2006.01)
    *C08L 1/10*     (2006.01)
    (Continued)

(52) U.S. Cl.
    CPC .. *C08L 1/10* (2013.01); *C08J 5/18* (2013.01); *C08K 5/13* (2013.01); *C08L 25/02* (2013.01);
    (Continued)

(58) Field of Classification Search
    CPC ............. C08L 1/10; C08L 1/12; C08L 1/14; C08J 2301/10; C08J 2301/12; C08J 2301/14; C08K 5/13; G02B 5/30; G02B 5/3033; G02B 5/3041; G02B 1/105; G02F 2201/50; G02F 1/133528; G02F 2001/133311; Y10T 428/10; Y10T 428/1041; Y10T 428/105
    USPC ........... 428/1.1, 1.3, 1.31, 1.33, 1.6; 349/96, 349/158; 359/487.01, 489.01; 106/170.1; 536/58, 64
    See application file for complete search history.

(56) References Cited

FOREIGN PATENT DOCUMENTS

JP  2003-012859 A  1/2003
JP  2003-183417 A  7/2003
(Continued)

OTHER PUBLICATIONS

Destruction and Stabilization of Cellulose Ethers, Vinogradov, et al, Plasticheskiye Massy, Sep. 1977, p. 2-3.*
Notification of the First Office Action issued by the State Intellectual Property Office of China on Jul. 21, 2015 in connection with Chinese Patent Appl. No. 201280048016.9.
(Continued)

*Primary Examiner* — Ruiyun Zhang
(74) *Attorney, Agent, or Firm* — Jean C. Edwards, Esq.; Edwards Neils LLC

(57) ABSTRACT

To provide a cellulose acylate film having low moisture permeability and low haze, a polarizing plate, and a liquid crystal display device using the same. A cellulose acylate film comprising at least a cellulose acylate, and a compound represented by the formula (1) below: in the formula (1), $R^1$ represents a hydrogen atom or substituent, $R^2$ represents a substituent represented by the formula (2) below; n1 represents an integer of 0 to 4, when n1 is 2 or larger, the plurality of ($R^1$)s may be same with or different from each other; n2 represents an integer of 1 to 5, when n2 is 2 or larger, the plurality of ($R^2$)s may be same with or different from each other.

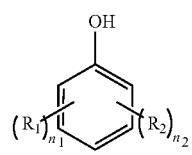

(1)

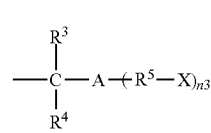

(2)

14 Claims, 1 Drawing Sheet

(51) Int. Cl.
  *C08J 5/18* (2006.01)
  *C08K 5/13* (2006.01)
  *G02B 1/10* (2015.01)
  *C08L 25/02* (2006.01)
  *G02F 1/1335* (2006.01)
  *G02F 1/1333* (2006.01)
  *G02B 5/30* (2006.01)

(52) U.S. Cl.
  CPC ............ *G02B 1/105* (2013.01); *C08J 2301/10* (2013.01); *G02B 5/3033* (2013.01); *G02F 1/133528* (2013.01); *G02F 2001/133311* (2013.01); *G02F 2201/50* (2013.01); *Y10T 428/10* (2015.01); *Y10T 428/105* (2015.01); *Y10T 428/31971* (2015.04)

(56) References Cited

FOREIGN PATENT DOCUMENTS

| | | |
|---|---|---|
| JP | 2005-105066 A | 4/2005 |
| TW | 200949319 A1 | 12/2009 |
| WO | WO 2009107405 A1 * | 9/2009 |

OTHER PUBLICATIONS

International Search Report issued in PCT/JP2012/075254 on Nov. 27, 2012.
Written Opinion issued in PCT/JP2012/075254 on Nov. 27, 2012.
International Preliminary Report on Patentability issued on Apr. 10, 2014, in connection with priority application No. PCT/JP2012/075254.

* cited by examiner

CELLULOSE ACYLATE FILM, POLARIZING PLATE AND LIQUID CRYSTAL DISPLAY DEVICE

CROSS-REFERENCE TO RELATED APPLICATIONS

The present application is a continuation of PCT/JP2012/075254 filed on Sep. 28, 2012, which was published under PCT article 21(2) in Japanese, and which in turn claims priority under 35 U.S.C. §119 of Japanese Patent Application No. 2011-216235 filed on Sep. 30, 2011, and Japanese Patent Application No. 2012-012008 filed on Jan. 24,2012.

TECHNICAL FIELD

The present invention relates to a cellulose acylate film capable of keeping boron content and having a high performance of reducing moisture content, a polarizing plate, and a liquid crystal display device, using the same.

BACKGROUND ART

Cellulose acylate film has been used for a variety of liquid crystal display devices, as optical components thereof such as a support of optical compensation film, a protective film for polarizing plate, and so forth.

With recent expanding applications of liquid crystal display devices, there has been a growing demand for large-sized, high-definition applications typically for television sets, and quality levels required for the polarizing plate and the polarizing plate protective film have been becoming more stringent. In particular, the large-sized and high-definition liquid crystal display devices have also been required to operate under various environments which have not been encountered before, for example as electronic signage or other outdoor use, even under severe high-temperature environments. The polarizing plate of the liquid crystal display devices, having been widely used, is configured by a polarizer, using polyvinyl alcohol (PVA) and iodine, held between the polarizing plate protective films typically composed of a cellulose acylate film. The polarizer using PVA and iodine has been suffering from a drawback that the performance thereof is likely to degrade under severe high-temperature environment, more specifically under high temperatures and high humidity. Accordingly, there has been a strong demand for further improvement.

Aimed at solving the durability of polarizer under such conditions, Patent Literature 1, for example, proposes a protective film for the polarizing plate, which contains a cellulosic ester film, and at least one species of plasticizer selected from rosin, rosin derivative, novolac-type epoxy resin, ketone resin, and toluenesulfonamide resin. Patent Literature 2 proposes use of a cellulose acrylate film, which was formed by adding an acrylic polymer having a molecular weight of 500 to 5,000 to the cellulosic ester, as the protective film for the polarizing plate.

However, when the protective films proposed by Patent Literature 1 and Patent Literature 2 are used under high temperatures and high humidity over a long time, the performance of the polarizer becomes degraded with time, proving that they were insufficient in terms of keeping necessary performances of the polarizer and further improvement would be necessary. Another problem was that the plasticizer in Patent Literature 1 and the acrylic polymer in Patent Literature 2 were less compatible with the cellulosic ester only to give a weak interaction, so that not only an effect of addition could not fully developed, but also the film was degraded in translucency (haze).

CITATION LIST

Patent Literature

[Patent Literature 1] JP-A-2003-183417
[Patent Piterature 2] JP-A-2003-12859

SUMMARY OF THE INVENTION

Technical Problem

The present inventors conducted thorough investigations to solve the problems described above, and found out that the content of boric acid, added for stabilizing a PVA-iodine complex, decreases in the polarizer with time under high temperatures and high humidity, and that this is one of reasons why the performance of the polarizer becomes degraded with time under high temperatures and high humidity, namely the orthogonal transmissivity elevates.

The present inventors also found out that the orthogonal transmissivity was prevented from elevating with time under high temperatures and high humidity, by adding a specific phenolic compound or a specific polymer containing a benzene ring in the main chain to the polarizing plate protective film (cellulose acylate film).

The present invention is conceived in consideration of the problems described above, and is focused to provide a cellulose acylate film capable of keeping boron content in the polarizer, and of suppressing orthogonal transmissivity from elevating, and a polarizing plate and a liquid crystal display device, using the same.

Solution to Problem

The problem was solved by a means described below.

[1] A cellulose acylate film comprising at least a cellulose acylate and a compound represented by the formula (1) below:

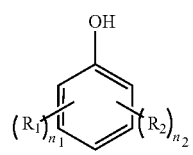
(1)

in the formula (1), $R^1$ represents a hydrogen atom or substituent, $R^2$ represents a substituent represented by the formula (2) below; n1 represents an integer of 0 to 4, when n1 is 2 or larger, the plurality of $(R^1)$s may be same with or different from each other; n2 represents an integer of 1 to 5, when n2 is 2 or larger, the plurality of $(R^2)$s may be same with or different from each other;

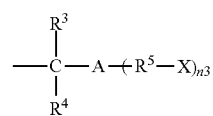
(2)

in the formula (2), A represents a substituted or unsubstituted aromatic ring; each of $R^3$ and $R^4$ independently represents a hydrogen atom, $C_{1-5}$ alkyl group or a substituent represented by the formula (3); $R^5$ represents a single bond or $C_{1-5}$ alkylene group; X represents a substituted or unsubstituted aromatic ring; n3 represents an integer of 0 to 10, when n3 is 2 or larger, the plurality of $(R^5)$s and (X)s may be same with or different from each other;

the individual symbols in the formula (3) are synonymous to those in the formula (2); each of $R^6$, $R^7$, $R^8$ and $R^9$ independently represents a hydrogen atom or $C_{1-5}$ alkyl group; n5 represents an integer of 1 to 11, when n5 is 2 or larger, the plurality of $(R^6)$s, $(R^7)$s, $(R^8)$s, $(R^9)$s and (X)s may be same with or different from each other.

[2] The cellulose acylate film of [1], wherein each of A and X in the formula (2) and formula (3) represents a benzene ring.

[3] The cellulose acylate film of [1] or [2], wherein the formula (2) is represented by the formula (2″) below:

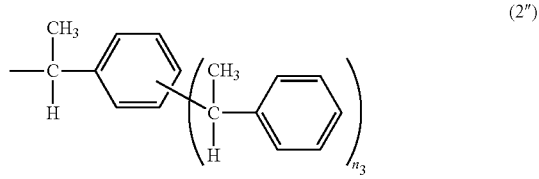

the individual symbols in the formula (2″) are synonymous to those in the formula (2).

[4] The cellulose acylate film of any one of [1] to [3], wherein the formula (3) is represented by the formula (3″):

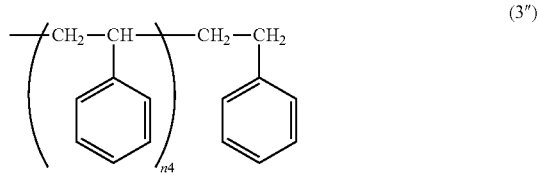

in the formula (3″), n4 represents an integer of 0 to 10.

[5] The cellulose acylate film of [3] or [4], wherein $R^1$ in the formula (1) represents a hydrogen atom or $C_{1-8}$ alkyl group, $R^2$ is represented by the formula (2″), n1 represents an integer of 2 to 4, n2 represents an integer of 1 to 3, and n3 represents an integer of 0 to 2.

[6] The cellulose acylate film of any one of [1] to [5], wherein the compound represented by the formula (1) is a mixture of at least two species, which are the compound represented by the formula (1), and another compound again represented by the formula (1) but different from the compound represented by the formula (1).

[7] The cellulose acylate film of any one of [1] to [6], wherein the compound represented by the formula (1) has a weight-average molecular weight of 200 to 1,200.

[8] The cellulose acylate film of any one of [1] to [7], wherein the cellulose acylate satisfies the degree of acyl substitution given by the relational expression below:

$$1.5 \leq A \leq 3.0$$

wherein A represents the degree of acyl substitution.

[9] The cellulose acylate film of any one of [1] to [8], wherein the cellulose acylate satisfies the degree of acetyl substitution given by the relational expression below:

$$2.0 \leq B \leq 3.0$$

wherein B represents the degree of acetyl substitution.

[10] The cellulose acylate film of any one of [1] to [9], further comprising at least one species of polycondensed ester-based plasticizer.

[11] The cellulose acylate film of [10], wherein the polycondensed ester-based plasticizer is obtained by polycondensation of at least one species of dicarboxylic acid represented by the formula (4) below, and at least one species of diol represented by the formula (5) below:

(in the formula (4), X represents a $C_{2-18}$ aliphatic group or aromatic group; in the formula (5), R represents a $C_{2-8}$ aliphatic group, the aliphatic group may be straight-chain, branched, or cyclic.).

[12] The cellulose acylate film of [10] or [11], wherein the polycondensed ester-based plasticizer has a number-average molecular weight of 500 to 2,000.

[13] The cellulose acylate film of any one of [10] to [12], wherein the terminals of the polycondensed ester-based plasticizer are blocked.

[14] The cellulose acylate film of any one of [1] to [9], further comprising at least one species of carbohydrate derivative-based plasticizer composed of monosaccharide or 2 to 10 monosaccharide units.

[15] The cellulose acylate film of [14], wherein the carbohydrate derivative-based plasticizer is substituted by alkyl group, aryl group or acyl group.

[16] The cellulose acylate film of [14] or [15], wherein the carbohydrate derivative-based plasticizer is substituted by acyl group.

[17] A polarizing plate comprising at least a polarizer, and the cellulose acylate film of any one of [1] to [16].

[18] A liquid crystal display device comprising at least a liquid crystal cell, and the polarizing plate of [17].

Advantageous Effects of Invention

According to the present invention, it is now possible to provide a cellulose acylate film having low moisture permeability and low haze, a polarizing plate, and a liquid crystal display device using the same.

DESCRIPTION OF EMBODIMENTS

Figure 1:
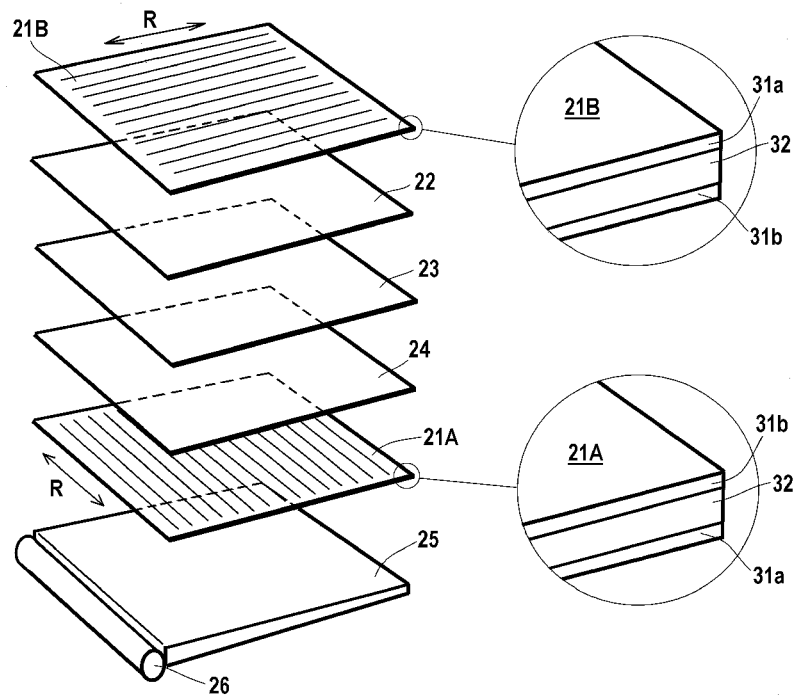
FIG. 1 An exploded perspective view schematically illustrating an internal structure of a liquid crystal display device.

The contents of the invention are described in detail hereinunder. In this description, the numerical range expressed by the wording "a number to another number" means the range that falls between the former number indicating the lowermost limit of the range and the latter number indicating the uppermost limit thereof.

1. Cellulose Acylate Film

The present invention relates to a cellulose acylate film which comprises a cellulose acylate, and a compound represented by the formula (1) below. According to the present invention, by adding the compound (styrenated phenol) represented by the formula (1) below, the water permeability may be lowered even in the cellulose acylate without degrading the haze, and the cellulose acylate film is now well adoptable to use as the polarizing plate protective film. While detailed reason why this effect is obtainable remains unclear, it is supposed that the phenolic hydroxyl groups and aromatic rings owned by the styrenated phenol strongly interact with the cellulose acylate. The cellulose acylate increases a larger stabilization energy by forming hydrogen bonds between itself and styrenated phenol, rather than between itself and water. In particular, when the styrenated phenol is a mixture of two different species respectively represented by the formula (1) below, the stabilization energy further increases since the styrenated phenols having different numbers of hydroxyl groups may form hydrogen bonds at multi-sites.

Accordingly, when the styrenated phenol-containing cellulose acylate is made into film, the styrenated phenol becomes more accessible around the main chain of the cellulose acylate, meanwhile water molecules become less accessible at around the main chain of the cellulose acylate, so that hydrophobicity is induced as a result of weakened interaction between water and the cellulose acylate. By virtue of the hydrophobicity, the cellulose acylate may be suppressed from water permeation therethrough. Accordingly, it is supposed that water permeation in the polarizer may be suppressed, by using the styrenated phenol-containing cellulose acylate film as the protective film of the polarizer.

Materials usable for the cellulose acylate film of the present invention will be detailed below.

1-1. Compound Represented by Formula (1) (Styrenated Phenol)

The cellulose acylate film of the present invention contains the compound represented by the formula (1) (styrenated phenol).

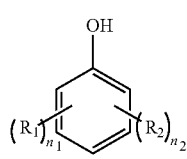

(1)

In the formula (1), $R^1$ represents a hydrogen atom or substituent, $R^2$ represents a substituent represented by the formula (2) below; n1 represents an integer of 0 to 4, when n1 is 2 or larger, the plurality of $(R^1)$s may be same with or different from each other; n2 represents an integer of 1 to 5, when n2 is 2 or larger, the plurality of $(R^2)$s may be same with or different from each other.

$R^1$ represents a hydrogen atom or a substituent. The substituent is exemplified, without special limitation, by alkyl group (preferably $C_{1-10}$ alkyl group, for example, methyl, ethyl, isopropyl, t-butyl, pentyl, heptyl, 1-ethylpentyl, benzyl, 2-ethoxyethyl, 1-carboxymethyl, etc.), alkenyl group (preferably $C_{2-20}$ alkenyl group, for example, vinyl, allyl, oleyl, etc.), alkynyl group (preferably $C_{2-20}$ alkynyl group, for example, ethynyl, butadienyl, phenylethynyl, etc.), cycloalkyl group (preferably $C_{3-20}$ cycloalkyl group, for example, cyclopropyl, cyclopentyl, cyclohexyl, 4-methylcyclohexyl, etc.), aryl group (preferably $C_{6-26}$ aryl group, for example, phenyl, 1-naphthyl, 4-methoxy phenyl, 2-chlorophenyl, 3-methylphenyl, etc.), heterocyclic group (preferably $C_{2-20}$ heterocyclic group, for example, 2-pyridyl, 4-pyridyl, 2-imidazolyl, 2-benzoimidazolyl, 2-thiazolyl, 2-oxazolyl, etc.), alkoxy group (preferably $C_{1-20}$ alkoxy group, for example, methoxy, ethoxy, isopropyloxy, benzyl oxy, etc.), aryloxy group (preferably $C_{6-26}$ aryloxy group, for example, phenoxy, 1-naphthyloxy, 3-methylphenoxy, 4-methoxyphenoxy, etc.), alkoxycarbonyl group (preferably $C_{2-20}$ alkoxycarbonyl group, for example, ethoxycarbonyl, 2-ethylhexyl oxycarbonyl, etc.), amino group (preferably $C_{0-20}$ amino group, for example, amino, N,N-dimethylamino, N,N-diethylamino, N-ethylamino, anilino, etc.), sulfonamide group (preferably $C_{0-20}$ sulfonamide group, for example, N,N-dimethylsulfonamide, N-phenyl sulfonamide, etc.), acyloxy group (preferably $C_{1-20}$ acyloxy group, for example, acetyloxy, benzoyloxy, etc.), carbamoyl group (preferably $C_{1-20}$ carbamoyl group, for example, N,N-dimethylcarbamoyl, N-phenylcarbamoyl, etc.), acylamino group (preferably $C_{1-20}$ acylamino group, for example, acetylamino, benzoylamino, etc.), cyano group, halogen atom (for example, fluorine atom, chlorine atom, bromine atom, iodine atom, etc.), and hydroxyl group. $R^1$ is preferably a hydrogen atom, $C_{1-20}$ alkyl group or hydroxyl group, and is more preferably a hydrogen atom, hydroxyl group or methyl group. $R^1$ may have, in the substituent thereof, one or more substituents described above.

n1 represents an integer of 0 to 4, and preferably 2 to 4.

n2 represents an integer of 1 to 5, and preferably 1 to 3.

n1 and n2 preferably satisfy the relation given by n1+n2=5.

$R^2$ represents a substituent represented by the formula (2) below.

(2)

In the formula (2), A represents a substituted or unsubstituted aromatic ring; each of $R^3$ and $R^4$ independently represents a hydrogen atom, $C_{1-5}$ alkyl group, or a substituent represented by the formula (3); $R^5$ represents a single bond or $C_{1-5}$ alkylene group; and X represents a substituted or unsubstituted aromatic ring; n3 represents an integer of 0 to 10, when n3 is 2 or larger, the plurality of $(R^5)$s and $(X)$s may be same with or different from each other.

"A" represents a substituted or unsubstituted aromatic ring. The aromatic ring may be a heterocycle which includes a hetero atom such as nitrogen atom, oxygen atom or sulfur atom. "A" is exemplified by benzene ring, indene ring, naphthalene ring, fluoroarene ring, phenanthrene ring, anthracene ring, biphenyl ring, pyrene ring, pyran ring, dioxane ring, dithiane ring, thin ring, pyridine ring, piperidine ring, oxazine ring, morpholine ring, thiazine ring, pyridazine ring, pyrimidine ring, pyrazine ring, piperazine ring and triazine ring. Any other six-membered ring or five-membered ring may be condensed. "A" is preferably a benzene ring. The substituent possibly owned by "A" is exemplified by halogen atom (for example, fluorine atom, chlorine atom, bromine atom, iodine atom, etc.), alkyl group, and hydroxyl group.

Each of $R^3$ and $R^4$ independently represents a hydrogen atom, $C_{1-5}$ alkyl group, or a substituent represented by the formula (3) below. Each of $R^3$ and $R^4$ preferably represents a hydrogen atom, $C_{1-3}$ alkyl group, or a substituent represented by the formula (3), and more preferably a hydrogen atom, methyl group, or the substituent represented by the formula (3).

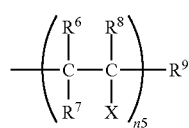

(3)

The individual symbols in the formula (3) are synonymous to those in the formula (2), accompanied by the same preferable ranges; each of $R^6$, $R^7$, $R^8$ and $R^9$ independently represents a hydrogen atom or $C_{1-5}$ alkyl group; n5 represents an integer of 1 to 11, when n5 is 2 or larger, the plurality of $(R^6)$s, $(R^7)$s, $(R^8)$s, $(R^9)$s and (X)s may be same with or different from each other.

Each of $R^6$, $R^7$, $R^8$ and $R^9$ independently represents a hydrogen atom or $C_{1-5}$ alkyl group. Each of $R^3$ and $R^4$ preferably represents a hydrogen atom or $C_{1-3}$ alkyl group, and more preferably represents a hydrogen atom or methyl group.

n5 represents an integer of 1 to 11, preferably 1 to 9, and more preferably 1 to 7.

The formula (3) is preferably represented by the formula (3') below.

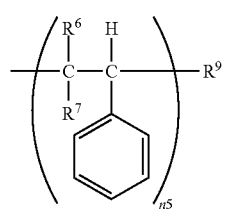

(3')

The individual symbols in the formula (3') are synonymous to those in the formula (3), accompanied by the same preferable ranges.

The formula (3) is preferably represented by the formula (3") below.

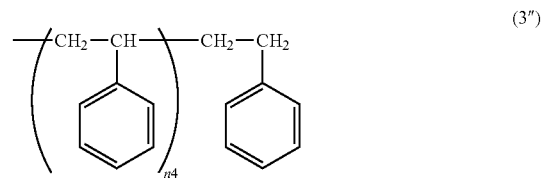

(3")

In the formula (3"), n4 represents an integer of 0 to 10.

n4 represents an integer of 0 to 10, preferably 0 to 8, and more preferably 0 to 6.

In the formula (2), $R^5$ represents a single bond or $C_{1-5}$ alkylene group which may have a substituent. $R^5$ is preferably a $C_{1-4}$ alkylene group, and more preferably $C_{1-3}$ alkylene group. Substituents which may be owned by $R^5$ are exemplified by $C_{1-5}$ alkyl group (for example, methyl, ethyl, isopropyl, t-butyl), halogen atom (for example, fluorine atom, chlorine atom, bromine atom, iodine atom, etc.), and hydroxyl group.

X represents a substituted or unsubstituted aromatic ring. The aromatic ring may be a heterocycle which contains a hetero atom such as nitrogen atom, oxygen atom, sulfur atom or the like. X is exemplified by benzene ring, indene ring, naphthalene ring, fluororene ring, phenanthrene ring, anthracene ring, biphenyl ring, pyrene ring, pyran ring, dioxane ring, dithiane ring, thin ring, pyridine ring, piperidine ring, oxazine ring, morpholine ring, thiazine ring, pyridazine ring, pyrimidine ring, pyrazine ring, piperazine ring, and triazine ring. Any other six-membered ring or five-membered ring may be condensed with X. X is preferably a benzene ring. The substituents which may be owned by X are same as those exemplified as the substituents for A.

n3 represents an integer of 0 to 10, preferably 0 to 2, and more preferably 0 to 1.

The formula (2) is preferably represented by the formula (2') below.

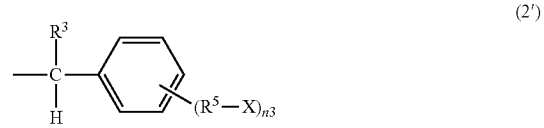

(2')

The individual symbols in the formula (2') are synonymous to those in the formula (2), accompanied by the same preferable ranges.

The formula (2) is preferably represented by the formula (2") below.

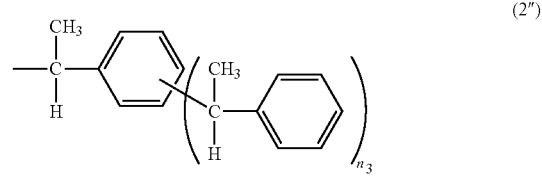

(2")

The individual symbols in the formula (2") are synonymous to those in the formula (2), accompanied by the same preferable ranges.

The compound represented by the formula (1) is preferably embodied so that $R^1$ represents a hydrogen atom or $C_{1-5}$ alkyl group, R² is represented by the formula (2″), n1 represents an integer of 2 to 4, n2 represents an integer of 1 to 3, and n3 represents an integer of 0 to 2.

Specific examples of the compound represented by the formula (1) will be shown below, while not being limited thereto.

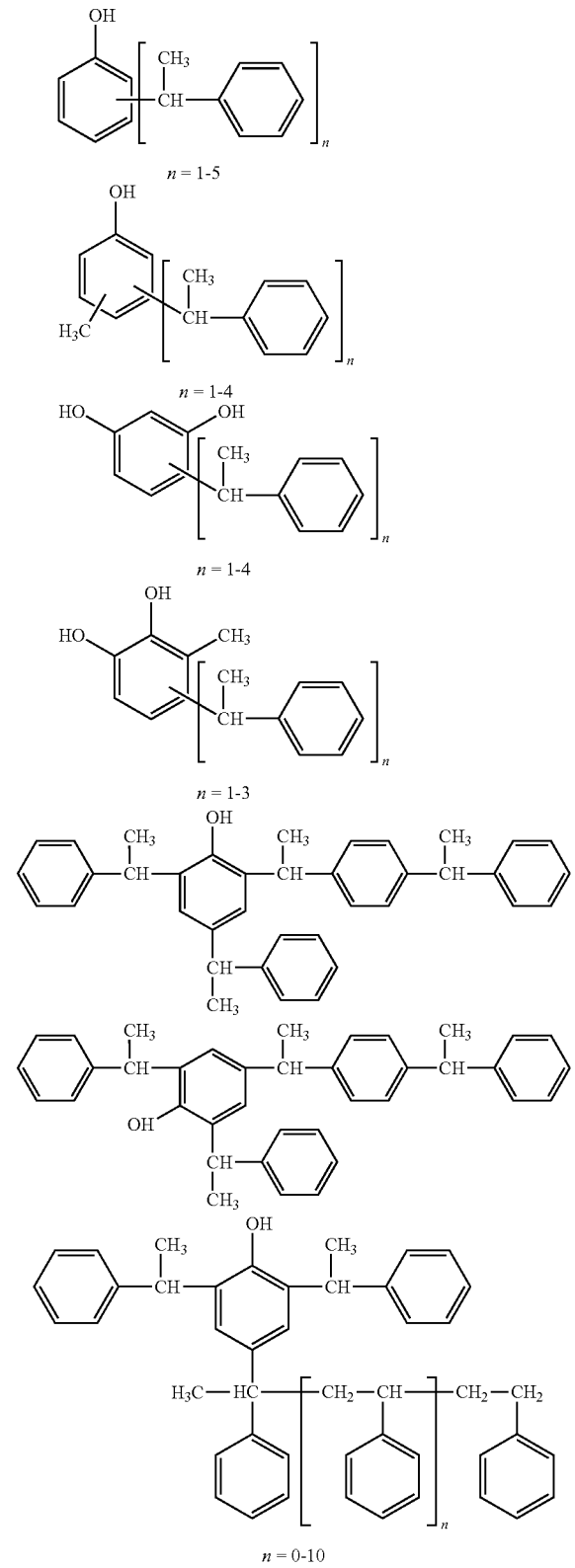

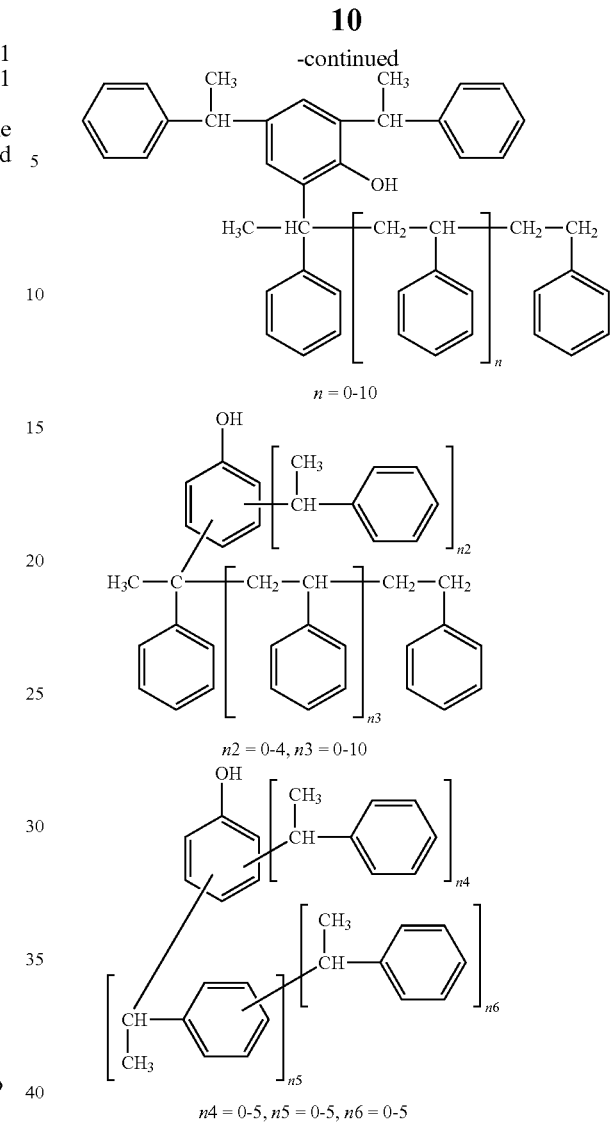

The compound represented by the formula (1) preferably has a weight-average molecular weight of 200 to 1,200, more preferably 250 to 1,000 and particularly 300 to 800.

If the molecular weight is smaller than 200, the compound may vaporize off from the film in some cases, and if it exceeds 1,200, the haze may increase.

While not specifically limited, the amount of addition of the compound represented by the formula (1) is preferably 0.1 to 100 parts by mass, more preferably 0.2 to 80 parts by mass, and particularly preferably 0.3 to 60 parts by mass per 100 parts by mass of the cellulose acylate.

If the amount of addition is less than 0.1 parts by mass, the moisture permeability would not effectively be reduced, meanwhile if the amount exceeds 100 parts by mass, the haze would increase.

In order to allow formation of multi-point hydrogen bonds by styrenated phenols having different numbers of hydroxyl groups, a mixture of at least two or more species of different compounds represented by the formula (1) may be used. Exemplified herein is a mixture of styrenated phenol wherein phenol is alkylated with 1 to 3 mol of styrene, styrenated phenol wherein the alkylated styrene is further alkylated with another styrene at the phenyl moiety thereof, and styrenated phenol wherein phenyl is alkylated with oligomer of styrene which is as long as dimer to tetramer.

The compound represented by the formula (1) may be synthesized generally by adding one or more equivalents of styrenes to one equivalent of phenols, under the presence of an acid catalyst, or is commercially available. A mixture obtained by the synthetic method described above may be used without modification.

1-2. Cellulose Acylate

In the present invention, cellulose acylate is used as a main ingredient of the film. In this specification, "main ingredient" in an embodiment where a single species of ingredient is used as a source material means that ingredient per se, meanwhile in an embodiment where two or more species of ingredients are used, it means an ingredient having the largest mass fraction. Only a single species of cellulose acylate may be used, or two or more species thereof may be used. The acyl substituents of the cellulose acylate may solely be acetyl groups. Alternatively, a composition containing cellulose acylates having a plurality of species of acyl substituents may be used.

Examples of the cellulose used as a starting material in preparation of cellulose acylate materials used for production of the cellulose acylate film include cotton linter and wood pulp (broadleaf pulp and coniferous pulp). Any cellulose acylate derived from such cellulose being the starting material may be used, and different cellulose acylates can be used in combination in some cases. The details of the cellulose being the starting material are disclosed by, for example, Marusawa., Uda. (1970). *Plastic Zairyo Kouza* (17), *Cellulosic Resin*. Nikkan Kogyo Shimbun Ltd. and Hatsumei Kyokai Disclosure Bulletin 2001-1745 (pp. 7-8).

A single species, or two or more species, of acyl groups may be used as the acyl group in cellulose acylate used in the cellulose acylate film. Cellulose acylate used for the cellulose acylate film preferably has a $C_{2-4}$ acyl group as a substituent. For the case where two or more species of acyl groups are used, one of them is preferably an acetyl group, and the $C_{2-4}$ acyl group is preferably a propionyl group or butyryl group. With these sorts of cellulose acylate, a solution with good solubility may be prepared, and in particular, a good solution may be prepared when a chlorine-free organic solvent is used. It becomes also possible to prepare a solution further small in viscosity and easy to filter.

First, the cellulose acylate preferably used for the present invention will be detailed. β-1,4-bonded glucose units composing cellulose have free hydroxyl groups on the 2-position, 3-position and 6-position. The cellulose acylate is a polymer obtained by acylating a part of, or all of these hydroxyl groups. The degree of acyl substitution means the total of ratios of acylation of hydroxyl groups on the 2-position, 3-position and 6-position of cellulose (100% acylation at the individual positions gives a degree of substitution of 1).

The total degree of acyl substitution (A) of the cellulose acylate is preferably 1.5 or larger and 3 or smaller ($1.5 \leq A \leq 3.0$), more preferably 2.0 to 2.97, furthermore preferably 2.5 or larger and smaller than 2.97, and particularly 2.70 to 2.95.

The total degree of acetyl substitution (B) of the cellulose acylate is preferably 2.0 or larger and 3 or smaller ($2.0 \leq B \leq 3.0$), more preferably 2.0 to 2.97, furthermore preferably 2.5 or larger and smaller than 2.97, and particularly 2.70 to 2.95.

$C_2$ or longer acyl group in the cellulose acylate may be either of aliphatic group and allyl group, without special limitation. It may be, for example, alkylcarbonyl ester, alkenylcarbonyl ester, aromatic carbonyl ester, or aromatic alkylcarbonyl ester of cellulose, wherein each of them may have a further substituted group. Preferable examples include acetyl group, propionyl group, butanoyl group, heptanoyl group, hexanoyl group, octanoyl group, decanoyl group, dodecanoyl group, tridecanoyl group, tetradecanoyl group, hexadecanoyl group, octadecanoyl group, isobutanoyl group, tert-butanoyl group, cyclohexane carbonyl group, oleoyl group, benzoyl group, naphthylcarbonyl group, and cinnamoyl group. Among them, more preferable are acetyl group, propionyl group, butanoyl group, dodecanoyl group, octadecanoyl group, tert-butanoyl group, oleoyl group, benzoyl group, naphthylcarbonyl group and cinnamoyl group, more preferable are acetyl group, propionyl group and butanoyl group (when the acyl group has 2 to 4 carbon atoms), and most preferable is acetyl group (when cellulose acylate is cellulose acetate).

In the acylation of cellulose, if acid anhydride or acid chloride is used as an acylating agent, then organic solvent as a reaction solvent is an organic acid, for example, acetic acid, methylene chloride or the like.

If the acylating agent is acid anhydride, the catalyst is preferably a protonic catalyst such as sulfuric acid, meanwhile, if the acylating agent is acid chloride (for example, $CH_3CH_2COCl$), a basic compound is used.

In a most general industrial method of synthesizing a mixed aliphatic ester of cellulose, cellulose is acylated with a mixed organic acid component which contains fatty acids corresponded to acetyl group and other acyl group(s) (acetic acid, propionic acid, valeric acid, etc.) or acid anhydrides of them.

The cellulose acylate may be synthesized by a method described, for example, in JP-A-H10-45804.

In the film of the present invention, content of the cellulose acylate is preferably 5 to 99% by mass in the whole solid content from the viewpoint of moisture permeability, more preferably 20 to 99% by mass, and particularly preferably 50 to 95% by mass.

1-3. Other Additives

The cellulose acylate film may also be added with additives such as polycondensed polymer; retardation modifier (retardation developer and retardation reducing agent); plasticizer such as phthalic ester or phosphoric ester; UV absorber; antioxidant; and matting agent.

(Polycondensed Polymer)

The cellulose acylate film preferably contains the polycondensed polymer, from the viewpoint of reducing the haze.

The polycondensed polymer, as an additive to the cellulose acylate film, is widely selectable from general high molecular weight additives. The content of the additive is preferably 1 to 35% by mass relative to the cellulosic resin, more preferably 4 to 30% by mass, and furthermore preferably 10 to 25% by mass.

The high molecular weight additives used as the polycondensed polymer for the cellulose acylate film are those having a repeating unit in the compound per se, and preferably have a number-average molecular weight of 700 to 10,000. The high molecular weight additives also function to accelerate vaporization of solvent or to reduce the content of residual solvent. They still also develop useful effects from the viewpoint of modification of the film, including improvement in the mechanical properties, provision of flexibility, provision of resistance to water absorption, and reduction in water permeability.

The high molecular weight additives, which are the polycondensed polymer used in the present invention, more preferably have a number-average molecular weight of 700 to 8,000, furthermore preferably 700 to 5,000, and particularly 1,000 to 5,000.

The high molecular weight additives, which are the polycondensed polymer used in the present invention, will be detailed referring to specific examples. Of course, the high molecular weight additives as the polycondensed polymer are not limited to these examples.

The polycondensed polymer is preferably a phosphoric ester-free compound. Note that the "phosphoric ester-free compound" means an ester-based compound containing no phosphoric ester.

The polymer-based additive as the polycondensed polymer is exemplified by polyester-based polymer (aliphatic polyester-based polymer, aromatic polyester-based polymer, etc.), and copolymer of polyester-based component and other component(s). Preferable are aliphatic polyester-based polymer, aromatic polyester-based polymer, copolymer of polyester-based polymer (aliphatic polyester-based polymer, aromatic polyester-based polymer, etc.) and acrylic polymer, and copolymer of polyester-based polymer (aliphatic polyester-based polymer, aromatic polyester-based polymer, etc.) and styrene-based polymer. It is more preferably a polyester compound containing at least an aromatic ring as one of the copolymerizable components.

The aliphatic polyester-based polymer is obtained by a reaction between a $C_{2-20}$ aliphatic dicarboxylic acid, and at least one or more species of diols selected from $C_{2-12}$ aliphatic diols and $C_{4-20}$ alkyl ether diols. While both terminals of the reaction product may remain intact as reacted, they may further be reacted with monocarboxylic acids, monoalcohols, or phenols to conduct so-called terminal blocking. The terminal blocking is conducted so as to avoid inclusion of, in particular, free carboxylic acids, from the viewpoint of storability. Dicarboxylic acid used for the polyester-based polymer in the present invention is preferably a $C_{4-20}$ aliphatic dicarboxylic acid residue or a $C_{8-20}$ aromatic dicarboxylic acid residue.

The aromatic polyester-based polymer used in the present invention is preferably the above-mentioned polyester which is combined with at least one species of each of aromatic dicarboxylic acids or aromatic diols, wherein the combination is not specifically limited, and several species of the individual components may be combined without problem. In the present invention, as described previously, it is particularly preferable to use the high molecular weight additive having the terminal thereof blocked, by the method mentioned above, with an alkyl group or aromatic group.

(Retardation Reducing Agent)

In the present invention, the retardation reducing agent is widely selectable from phosphoric ester-based compound, and compounds other than phosphoric ester-free compounds which are publicly known as additives for the cellulose acylate film.

Polymer-based retardation reducing agent is selectable from phosphate-based, polyester-based polymer, styrene-based polymer, acrylic polymer and copolymer of them, wherein acrylic polymer and styrene-based polymer are preferable. At least one species of polymer having a negative intrinsic birefringence, such as styrene-based polymer and acrylic polymer, is preferably contained.

Low molecular weight retardation reducing agents, which belong to compounds other than the phosphoric ester-free compound, are exemplified as follows. They may be solid or oily substances. In other words, there are no special limitations on the melting point and boiling point. For example, UV absorbing materials with 20° C. or lower and 20° C. or higher, or deterioration inhibitors of the same are usable in a mixed manner. Furthermore, infrared absorbing dyes are described in, for example, JP-A-2001-194522. Time of addition of the additives is arbitrary in the process of preparing the cellulose acylate solution (dope), or the additives may be added in an additional step provided succeeding to the final step of preparation of the dope. Amounts of addition of the individual materials are not specifically limited, so long as their functions are developed.

The low molecular weight retardation reducing agents, which belong to compounds other than the phosphoric ester-free compound, are detailed in paragraphs [0066] to [0085] of JP-A-2007-272177, but not specifically limited thereto.

The compounds represented by the formula (1) in the paragraphs [0066] to [0085] of JP-A-2007-272177 may be prepared by a method described below.

The compounds represented by the formula (1) in the gazette are obtainable by a condensation reaction between sulfonyl chloride derivatives and amine derivatives.

Compounds represented by the formula (2) in JP-A-2007-272177 are obtainable by a dehydration condensation between carboxylic acids and amines using a condensing agent (dicyclohexyl carbodiimide (DCC), for example), or by a substitution reaction between carboxylic acid chloride derivatives and amine derivatives.

The retardation reducing agent is preferably a Rth reducing agent, from the viewpoint of implementing an appropriate Nz factor. Among the retardation reducing agents, Rth reducing agent is exemplified by acrylic polymer and styrene-based polymer, and low molecular weight compounds represented by the formulae (3) to (7) in JP-A-2007-272177. Among them, acrylic polymer and styrene-based polymer are preferable, and acrylic polymer is more preferable.

The amount of addition of the retardation reducing agent is preferably 0.01-30% by mass relative to the cellulosic resin, more preferably 0.1 to 20% by mass, and particularly 0.1 to 10% by mass.

With the amount of addition adjusted to 30% by mass or less, the compatibility with the cellulosic resin may be improved, and thereby whitening may be suppressed. When two or more species of the retardation reducing agents are used, the total amount preferably falls in these ranges.

(Retardation Developer)

The cellulose acylate film preferably contains at least one species of retardation developer, in view of developing a retardation value. The retardation developer is exemplified by those composed of rod-like or discotic compound, and those with retardation developing performance among from the phosphoric ester-free compounds, without special limitation. Among from the rod-like or discotic compound, those having at least two aromatic rings are preferably used as the retardation developer.

The amount of addition of the retardation developer composed of the rod-like compound is preferably 0.1 to 30 parts by mass and more preferably 0.5 to 20 parts by mass, per 100 parts by mass of the polymer component which contains the cellulose acylate. The content of the discotic compound contained in the retardation developer is preferably less than 3 parts by mass, more preferably less than 2 parts by mass, and particularly less than 1 part by mass, per 100 parts by mass of the cellulose acylate.

The discotic compound, which is superior to the rod-like compound in terms of developability of Rth retardation, is preferably used for the case where a particularly large Rth retardation is necessary. Two or more species of the retardation developers may be used in combination.

The retardation developer preferably shows a maximum absorption in the wavelength range from 250 to 400 nm, and preferably shows substantially no absorption in the visible light region.

The retardation developer is detailed in Japanese Journal of Technical Disclosure No. 2001-1745, p. 49.

(Plasticizer (Hydrophobizing Agent))

The cellulose acylate film of the present invention preferably contains at least one plasticizer (hydrophobizing agent) selected from polyhydric alcohol ester-based plasticizer (hydrophobizing agent), polycondensed ester-based plasticizer (hydrophobizing agent) and carbohydrate derivative-based plasticizer (hydrophobizing agent). The plasticizer is preferably those capable of reducing the water content without lowering as possible the glass transition point of the film. With use of the plasticizer like this, the additives in the cellulose acylate film may be prevented from diffusing into the polarizer layer under high temperatures and high humidity, and thereby the performances of the polarizer may be suppressed from degrading. The plasticizer usable in the present invention will be detailed below.

(Polyhydric Alcohol Ester-Based Plasticizer)

Polyhydric alcohol usable in the present invention is represented by the formula (4A) below.

$$R^1\text{—}(OH)_n \qquad \text{Formula (4A)}$$

(where, $R^1$ represents an n-valent organic group, and n represents a positive integer of 2 or larger.)

Preferable examples of the polyhydric alcohol-based plasticizer include those listed below, without limiting the present invention. The examples include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, and xylitol. Particularly preferable are triethylene glycol, tetraethylene glycol, dipropylene glycol, tripropylene glycol, sorbitol, trimethylolpropane, and xylitol.

Among them, the polyhydric alcohol-based plasticizer is preferably polyhydric alcohol ester derived from $C_5$ or longer polyhydric alcohol, and particularly $C_{5-20}$ ones.

Monocarboxylic acid composing the polyhydric alcohol ester is selectable, without special limitation, from publicly known aliphatic monocarboxylic acid, alicyclic monocarboxylic acid, aromatic monocarboxylic acid and so forth. Use of alicyclic monocarboxylic acid or aromatic monocarboxylic acid is preferable in view of improving the moisture permeability and retention characteristics.

Examples of the monocarboxylic acid preferably used for the polyhydric alcohol ester include those described below, without limiting the present invention.

The aliphatic monocarboxylic acid preferably used herein is any of $C_{1-32}$ straight-chain or branched fatty acids, preferably having 1 to 20 carbon atoms, and more preferably 1 to 10 carbon atoms. With acetic acid contained therein, the compatibility with the cellulose derivative may preferably be improved. It is also preferable to use acetic acid mixed with other monocarboxylic acid.

Preferable examples of the aliphatic monocarboxylic acid include saturated fatty acids such as acetic acid, propionic acid, butyric acid, valeric acid, caproic acid, enathic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanic acid, montanic acid, melissic acid, and lacceric acid; and unsaturated fatty acids such as undecylenic acid, oleic acid, sorbic acid, linoleic acid, linolenic acid, and arachidonic acid.

Preferable examples of the alicyclic monocarboxylic acid include cyclopentane carboxylic acid, cyclohexane carboxylic acid, cyclooctane carboxylic acid, and derivatives of them.

Preferable examples of the aromatic monocarboxylic acid include benzoic acid; compounds having an alkyl group introduced into the benzene ring of benzoic acid such as toluoylic acid; and aromatic monocarboxylic acids having two or more benzene rings such as biphenyl carboxylic acid, naphthalene carboxylic acid, tetralin carboxylic acid and so forth, and derivatives of thereof. Benzoic acid is particularly preferable.

While not specifically limited, the molecular weight of the polyhydric alcohol-based plasticizer is preferably 300 to 3,000, and more preferably 350 to 1,500. Larger molecular weight is preferred since the plasticizer becomes less volatile, meanwhile smaller molecular weight is preferred from the viewpoint of moisture permeability and compatibility with the cellulose derivative.

The carboxylic acid used for the polyhydric alcohol ester may be of a single species, or a mixture of two or more species. The hydroxyl groups in the polyhydric alcohol may fully be esterified, or may partially be remained intact.

Specific compounds of the polyhydric alcohol ester are shown below.

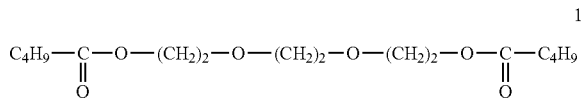

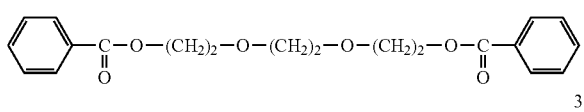

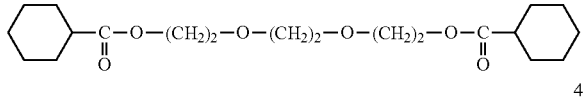

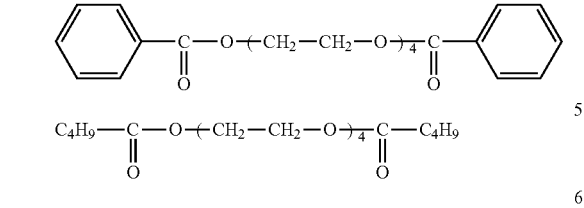

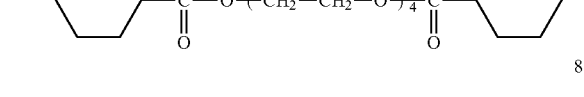

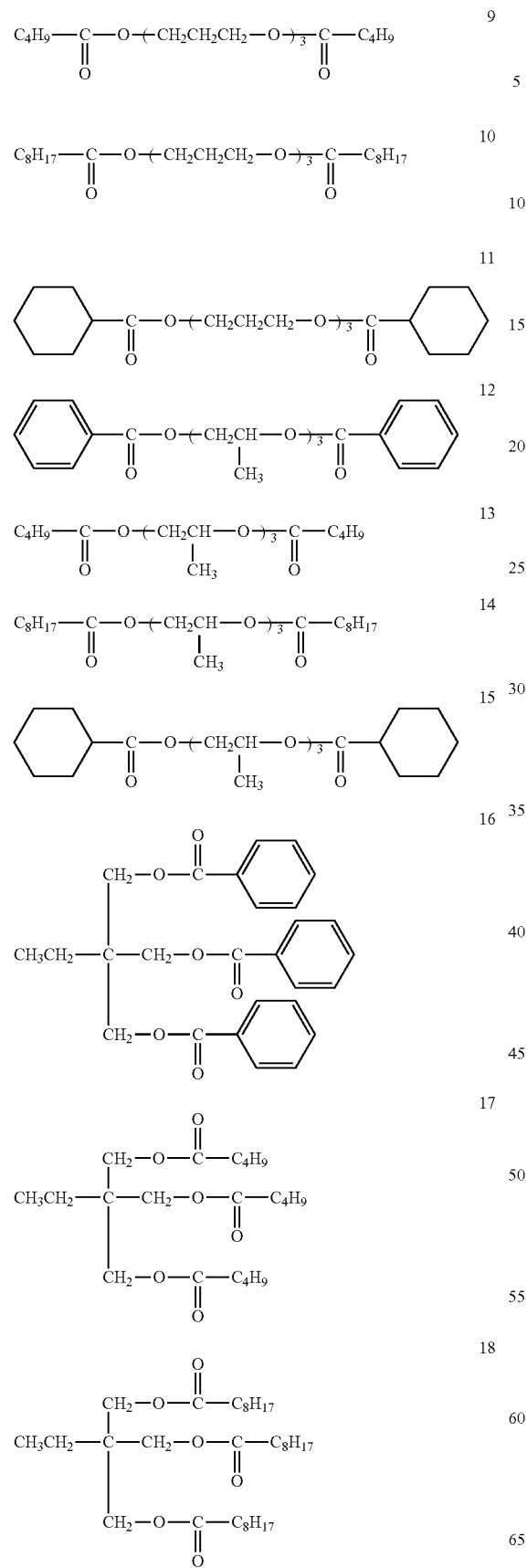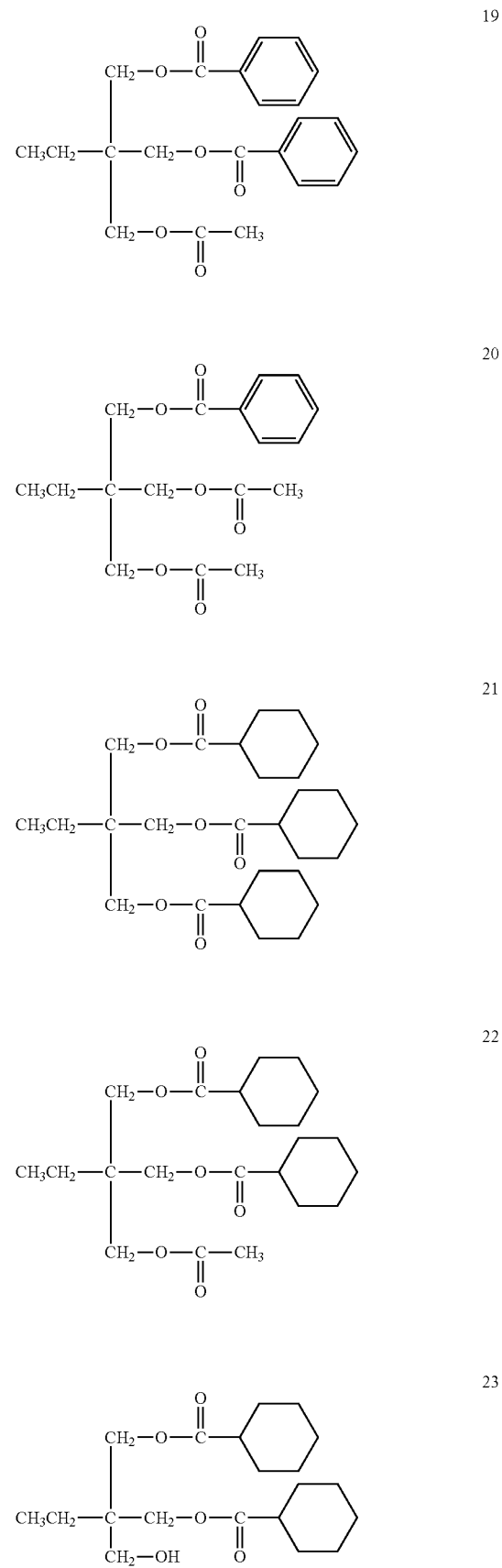

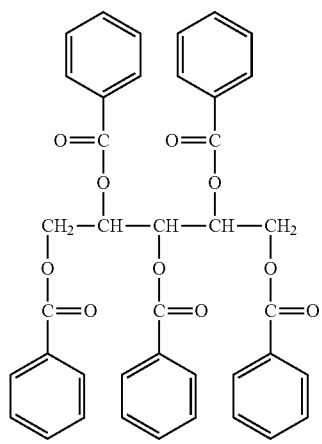
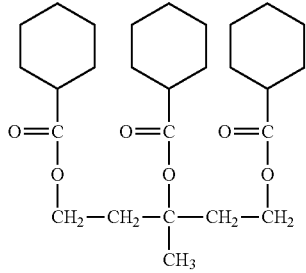
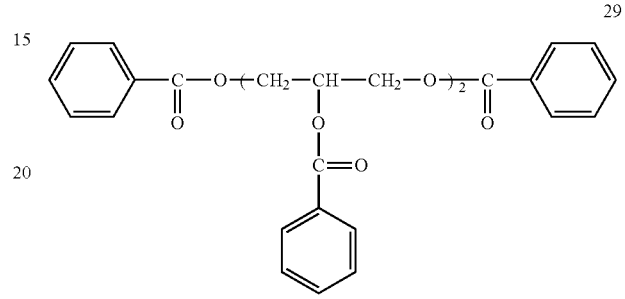
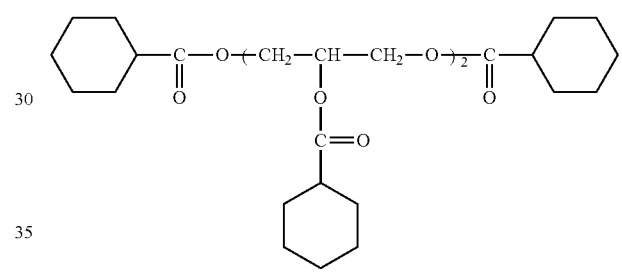
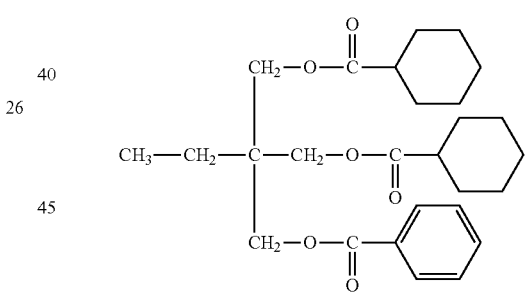
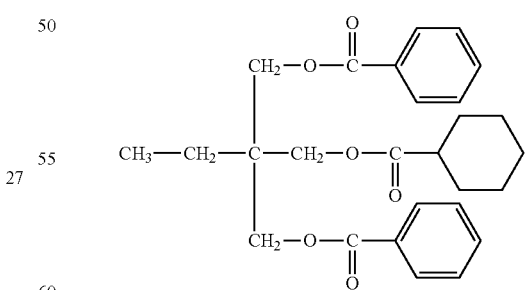
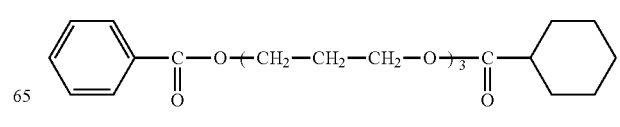

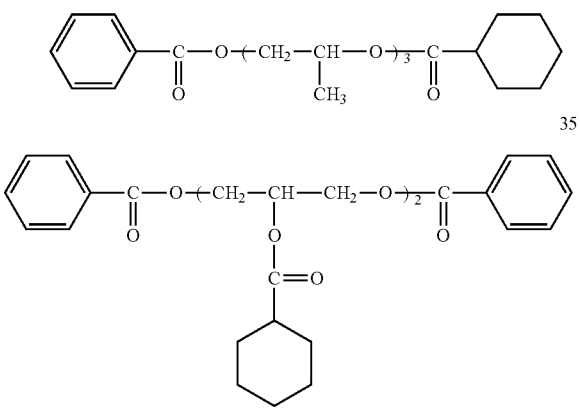

(Polycondensed Ester-Based Plasticizer)

It is preferable for the cellulose acylate film of the present invention to additionally contain a polycondensed ester-based plasticizer. With the polycondensed ester-based plasticizer contained therein, the cellulosic ester film obtainable herein will be improved in the stability against humidity, and will give a highly durable polarizing plate.

The polycondensed ester-based plasticizer is preferably obtained by polycondensation of at least one species of dicarboxylic acid represented by the formula (4) below, and at least one species of diol represented by the formula (5) below.

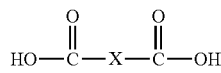

(4)

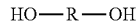

(5)

(in the formula (4), X represents a $C_{2-18}$ aliphatic group or aromatic group; in the formula (5), R represents a $C_{2-8}$ aliphatic group; the aliphatic group may be either of straight-chain and branched ones.)

In the formula (4), X represents a $C_{2-18}$ aliphatic group or aromatic group.

The $C_{2-18}$ aliphatic group may be saturated or unsaturated, and may be either of chain-like aliphatic group and cyclic aliphatic group (for example, cycloalkyl groups). The chain-like aliphatic group may be either of straight-chain aliphatic group and branched aliphatic group. The aliphatic group has 2 to 18 carbon atoms, more preferably 2 to 12 carbon atoms, and furthermore preferably 2 to 6 carbon atoms. Among them, the $C_{2-18}$ aliphatic group is preferably a chain-like saturated aliphatic group, more preferably chain-like alkyl group, and furthermore preferably straight-chain alkyl group. The $C_{2-18}$ chain-like alkyl group is specifically exemplified by ethyl group, propyl group, butyl group, s-butyl group, t-butyl group, n-pentyl group, n-hexyl group, cyclohexyl group, n-heptyl group, n-octyl group, n-decyl group and dodecyl group.

The aromatic group may be an aromatic hydrocarbon group or aromatic heterocyclic group. The aromatic group preferably has 6 to 15 carbon atoms, and more preferably has 6 to 12 carbon atoms. The aromatic hydrocarbon group is specifically exemplified by rings of benzene, naphthalene, anthracene, biphenyl and terphenyl. The aromatic heterocyclic group preferably contains at least one of oxygen atom, nitrogen atom and sulfur atom. The heterocycle is specifically exemplified by furan, pyrrole, thiophene, imidazole, pyrazole, pyridine, pyrazine, pyridazine, triazole, triazine, indole, indazole, purine, thiazoline, thiadiazol, oxazoline, oxazole, oxadiazole, quinoline, isoquinoline, phthalazine, naphthyridine, quinoxaline, quinazoline, cinnolin, pteridine, acridine, phenanthoroline, phenazine, tetrazole, benzimidazole, benzoxazole, benzthiazole, benzotriazol, and tetrazaindene. Among them, the aromatic hydrocarbon group is preferably benzene, naphthalene or biphenyl, and the aromatic heterocyclic group is preferably pyridine, triazine or quinoline.

In the formula (5), R preferably represents a $C_{2-8}$ aliphatic group. The $C_{2-8}$ aliphatic group may be saturated or unsaturated, and may be a chain-like aliphatic group or a cyclic aliphatic group (for example, cycloalkyl groups). The chain-like aliphatic group may be a straight-chain aliphatic group or branched aliphatic group. The aliphatic group has 2 to 8 carbon atoms, more preferably 2 to 6 carbon atoms, and furthermore preferably 2 to 4 carbon atoms. Among them, the $C_{2-8}$ aliphatic group is preferably a chain-like saturated aliphatic group, and more preferably chain-like alkyl group, and furthermore preferably straight-chain alkyl group. The $C_{5-10}$ chain-like alkyl group is specifically exemplified by ethyl group, propyl group, isopropyl group, n-butyl group, iso-butyl group, sec-butyl group, tert-butyl group, n-pentyl group, n-hexyl group, cyclohexyl group, n-heptyl group, and n-octyl group.

The polycondensed ester-based plasticizer is preferably obtained from at least one species of aromatic ring-containing dicarboxylic acid (also referred to as aromatic dicarboxylic acid) and at least one species of aliphatic diol having an average number of carbon atoms of 2.5 to 8.0. It is also preferably obtained from a mixture of an aromatic dicarboxylic acid and at least one species of aliphatic dicarboxylic acid, further mixed with at least one species of aliphatic diol having an average number of carbon atoms of 2.5 to 8.0.

The average number of carbon atoms of the dicarboxylic acid residue is calculated independently for the dicarboxylic acid residue and the diol residue.

The average number of carbon atoms is calculated by multiplying the compositional ratios (molar fractions) of the dicarboxylic acid residues by the number of constitutive carbon atoms. For an exemplary plasicizer composed of 50 mol % each of adipic acid residue and phthalic acid residue, then the average number of carbon atoms is 7.0.

The same will apply to the diol residue, wherein the average number of carbon atoms of the diol residue is calculated by multiplying the compositional ratios (molar fractions) of the diol residues by the number of constitutive carbon atoms. For an exemplary plasticizer composed of 50 mol % each of ethylene glycol residue and 1,2-propanediol residue, then the average number of carbon atoms is 2.5.

The polycondensed ester-based plasticizer preferably has a number-average molecular weight of 500 to 2,000, more preferably 600 to 1,500, and furthermore preferably 700 to 1,200. The polycondensed ester having a number-average molecular weight of 600 or larger will be less volatile, and will therefore be less likely to produce film failure or to pollute the process which would otherwise be induced by vaporization in the process of stretching of the cellulosic ester film under high temperature conditions. On the other hand, the polycondensed ester having a molecular weight of 2,000 or less will be improved in the compatibility with the cellulosic ester, and will therefore be less likely to breed out in the process of film-forming or stretching under heating.

The number-average molecular weight of the polycondensed ester may be measured and evaluated by gel permeation chromatography. For polyester polyol with unblocked terminals, it is also calculable based on the amount of hydroxyl group per unit weight (also referred to as hydroxyl value). In the present invention, the hydroxyl value is represented by the amount of potassium hydroxide necessary for neutralizing an excessive acetic acid which remained after acetylation of polyester polyol.

When a mixture of aromatic dicarboxylic acid and aliphatic dicarboxylic acid is used as the dicarboxylic acid component, the average number of carbon atoms of the dicarboxylic acid component is preferably 5.5 to 10.0, and more preferably 5.6 to 8.

With the average number of carbon atoms of 5.5 or larger, it is now possible to obtain the polarizing plate excellent in durability. With the average number of carbon atoms of 10 or less, the plasticizer will have a good compatibility with the cellulosic ester, and will become less likely to breed out in the process of forming the cellulosic ester film.

The polycondensed ester obtained from diol and dicarboxylic acid including aromatic dicarboxylic acid contains an aromatic dicarboxylic acid residue.

In this specification, "residue" means a partial structure of the polycondensed ester, which retains an attribute of a monomer composing the polycondensed ester. For example, dicarboxylic acid residue formed by a dicarboxylic acid HOOC—R—COOH is given by —OC—R—CO—.

Ratio of the aromatic dicarboxylic acid residue in the polycondensed ester used in the present invention is preferably 40 mol % or more, and more preferably 40 mol % to 95 mol %.

With a ratio of aromatic dicarboxylic acid residue of 40 mol % or more, the cellulosic ester film obtained herein will show a satisfactory level of optical anisotropy, and will give the polarizing plate with good durability. With a ratio of 95 mol % or less, the plasticizer will show good compatibility with the cellulosic ester, and will become less likely to breed out in the process of forming of the cellulosic ester film, and in the process of stretching under heating.

The aromatic dicarboxylic acid usable for forming the polycondensed ester-based plasticizer usable in the present invention is exemplified by phthalic acid, terephthalic acid, isophthalic acid, 1,5-naphthalene dicarboxylic acid, 1,4-naphthalene dicarboxylic acid, 1,8-naphthalene dicarboxylic acid, 2,8-naphthalene dicarboxylic acid and 2,6-naphthalene dicarboxylic acid. Among them, phthalic acid, terephthalic acid, and 2,6-naphthalene dicarboxylic acid are preferable, phthalic acid and terephthalic acid are more preferable, and terephthalic acid is furthermore preferable.

In the polycondensed ester, an aromatic dicarboxylic acid residue derived from the aromatic dicarboxylic acid used in the mixing, is formed.

More specifically, the aromatic dicarboxylic acid residue preferably contains at least one species selected from phthalic acid residue, terephthalic acid residue and isophthalic acid residue, more preferably contains at least one species selected from phthalic acid residue and terephthalic acid residue, and furthermore preferably contains terephthalic acid residue.

By mixing terephthalic acid as the aromatic dicarboxylic acid in the process of forming the polycondensed ester, the plasticizer will show good compatibility with the cellulosic ester, and thereby the cellulosic ester film will become less likely to cause breeding-out in the process of forming thereof, and in the process of stretching under heating. Only a single species, or two or more species of the aromatic dicarboxylic acid may be used. If two or more species thereof are used, phthalic acid and terephthalic acid are preferably used.

By using two species of aromatic dicarboxylic acids in combination, which are phthalic acid and terephthalic acid, the polycondensed ester will be softened at normal temperature, and will preferably become more ready to handle.

Content of the terephthalic acid residue, out of the dicarboxylic acid residue in the polycondensed ester is preferably 40 mol % to 100 mol %.

With a ratio of the terephthalic acid residue of 40 mol % or more, the cellulosic ester film showing a satisfactory level of optical anisotropy may be obtained.

The polycondensed ester obtained from diol, and dicarboxylic acid containing aliphatic dicarboxylic acid, contains an aliphatic dicarboxylic acid residue.

Examples of the aliphatic dicarboxylic acid capable of forming the polycondensed ester-based plasticizer preferably used in the present invention include oxalic acid, malonic acid, succinic acid, maleic acid, fumaric acid, glutaric acid, adipic acid, pimelic acid, suberic acid, azelaic acid, sebacic acid, dodecane dicarboxylic acid and 1,4-cyclohexane dicarboxylic acid.

In the polycondensed ester, an aliphatic dicarboxylic acid residue derived from the aliphatic dicarboxylic acid used for the mixing, is formed.

The aliphatic dicarboxylic acid residue preferably has an average number of carbon atoms of 5.5 to 10.0, more preferably 5.5 to 8.0, and furthermore preferably 5.5 to 7.0. If the aliphatic dicarboxylic acid residue has an average number of carbon atoms of 10.0 or smaller, the compound will be reduced in weight loss on heating, and the cellulose acylate web will become unlikely to produce surface failure supposedly ascribable to pollution of the process due to breeding-out during drying of the web. If the aliphatic dicarboxylic acid residue has an average number of carbon atoms of 5.5 or larger, it will be preferable since it will have a good compatibility, and the polycondensed ester will be less likely to deposit.

More specifically, the aliphatic dicarboxylic acid residue preferably contains a succinic acid residue. When two species are used, succinic acid residue and adipic acid residue are preferably contained.

In other words, for the mixing in the process of forming the polycondensed ester, a single species, or two or more species of aliphatic dicarboxylic acids may be used. When two species are used, succinic acid and adipic acid are preferably used. When a single species of aliphatic dicarboxylic acid is used for the mixing in the process of preparation of the polycondensed ester, succinic acid is preferably used. The average number of carbon atoms of the aliphatic dicarboxylic acid residue will be adjustable to a desired value, and this is preferable in view of compatibility with the cellulosic ester.

In the present invention, for the mixing in the process of formation of the polycondensed ester, it is preferable to use two or three species of dicarboxylic acids. When two species are used, it is preferable to use one species each of the aliphatic dicarboxylic acid and the aromatic dicarboxylic acid. When three species are used, it is preferable to use one species of aliphatic dicarboxylic acid and two species of aromatic dicarboxylic acids, or, two species of aliphatic dicarboxylic acids and one species of aromatic dicarboxylic acid. This is because the average number of carbon atoms of the dicarboxylic acid residue will be more ready to control, and the content of the aromatic dicarboxylic acid residue will be adjustable in a preferable range, thereby the durability of the polarizer will be improved.

The polycondensed ester obtained from diol and dicarboxylic acid containing dicarboxylic acid contains a diol residue.

In this specification, a diol residue formed from diol HO—R—OH is given by diol residue —O—R—O—.

The diol composing the polycondensed ester is exemplified by aromatic diol and aliphatic diol, wherein the polycondensed ester usable as the plasticizer usable in the present invention is preferably formed from at least aliphatic diol.

The polycondensed ester preferably contains an aliphatic diol residue with an average number of carbon atoms of 2.5 to 7.0, and more preferably contains an aliphatic diol residue with an average number of carbon atoms of 2.5 to 4.0. With the average number of carbon atoms of the aliphatic diol residue smaller than 7.0, the plasticizer will be improved in the compatibility with the cellulosic ester, will become less likely to breed out, the compound will become less likely to increase the weight loss on heating, and thereby the cellulose acylate web will become less likely to produce surface failure possibly ascribable to pollution of the process during drying of the web. With the average number of carbon atoms of aliphatic diol residue of 2.5 or more, the synthesis will be simple.

Aliphatic diol capable of forming the polycondensed ester-based plasticizer, usable in the present invention, is preferably exemplified by alkyl diol or alicyclic diol. Preferable examples include ethylene glycol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, diethylene glycol, and cyclohexanedimethanol. They are preferably used independently, or as a mixture of two or more species together with ethylene glycol.

More preferable example of the aliphatic diol is at least one species of ethylene glycol, 1,2-propanediol and 1,3-propanediol, and particularly at least one species of ethylene glycol and 1,2-propanediol. When the polycondensed ester is formed using two species of aliphatic diol, it is preferable to use ethylene glycol and 1,2-propanediol. By using 1,2-propanediol or 1,3-propanediol, the polycondensed ester may be prevented from crystallizing.

In the polycondensed ester, a diol residue is formed by the diol mixed therein.

In other words, the polycondensed ester preferably contains, as the diol residue, at least one species of ethylene glycol residue, 1,2-propanediol residue, and 1,3-propanediol residue, and more preferably ethylene glycol residue or 1,2-propanediol residue.

The aliphatic diol residue contained in the polycondensed ester preferably contains 10 mol % to 100 mol %, and more preferably 20 mol % to 100 mol % of ethylene glycol residue.

The terminals of the polycondensed ester may remain unblocked in the form of diol or carboxylic acid, or may be subjected to so-called terminal blocking, by reacting them with monocarboxylic acids or monoalcohols. The polycondensed ester with the blocked terminals will be less likely to solidify at normal temperature, more ready to handle, and thereby the cellulose ester film obtainable herein will be improved in the stability against humidity, and will give a highly durable polarizing plate.

Preferable examples of the monocarboxylic acids usable for the blocking include acetic acid, propionic acid, butyric acid, and benzoic acid. Preferable examples of the monoalcohols usable for the blocking include methanol, ethanol, propanol, isopropanol, butanol, and isobutanol, wherein methanol is most preferable. If the monocarboxylic acids used for blocking the terminals of the polycondensed ester has 7 or less carbon atoms, the compound will become less likely to increase the weight loss on heating, and thereby the cellulose acylate web will become less likely to produce surface failure.

It is further preferable that the terminals of the polycondensed ester remain unblocked in the form of diol residue, or blocked by acetic acid or propionic acid or benzoic acid.

It is not always necessary that both terminals of the polycondensed ester are equally blocked or unblocked.

If both terminals of the condensed matter remain unblocked, the polycondensed ester is preferably a polyester polyol.

One embodiment of the polycondensed ester is exemplified by a polycondensed ester having an aliphatic diol residue having 2.5 to 8.0 carbon atoms, and having both terminals unblocked.

If the polycondensed ester has both terminals blocked, the blocking is preferably established by a reaction with a monocarboxylic acid. In this case, both terminals of the polycondensed ester are in the form of monocarboxylic acid residue. In this specification, the monocarboxylic acid residue derived from the monocarboxylic acid R—COOH is given by R—CO—. When both terminals of the polycondensed ester are blocked by the monocarboxylic acid, the monocarboxylic acid is preferably an aliphatic monocarboxylic acid residue, more preferably an aliphatic monocarboxylic acid residue having a $C_{22}$ or shorter monocarboxylic acid residue, and furthermore preferably $C_3$ or shorter aliphatic monocarboxylic acid residue. It is preferably a $C_2$ or longer aliphatic monocarboxylic acid residue, and particularly a $C_2$ aliphatic monocarboxylic acid residue.

One embodiment of the polycondensed ester is exemplified by a polycondensed ester having an aliphatic diol residue having the number of carbon atoms larger than 2.5 and 7.0 or less, and having both terminals blocked with the monocarboxylic acid residues.

If the monocarboxylic acid residues which block both terminals of the polycondensed ester have 3 or less carbon atoms, the volatility will decrease, and the polycondensed ester will become less likely to increase the weight loss on heating, and thereby the pollution of process or the surface failure are avoidable.

More specifically, the monocarboxylic acids used for the blocking is preferably aliphatic monocarboxylic acid, more preferably $C_{2-22}$ aliphatic monocarboxylic acid, more preferably $C_{2-2}$ aliphatic monocarboxylic acid, and particularly $C_2$ aliphatic monocarboxylic acid residue.

For example, acetic acid, propionic acid, butyric acid, benzoic acid and derivatives thereof are preferable, acetic acid and propionic acid are more preferable, and acetic acid is most preferable.

Two or more species of the monocarboxylic acids may be mixed for use in the blocking.

Both terminals of the polycondensed ester are preferably blocked by acetic acid or propionic acid. In the most preferable embodiment, the polycondensed ester is blocked at both terminals with acetic acid to give a form of acetyl ester residue (occasionally referred to as "acetyl residue").

Specific examples J-1 to J-41 of the polycondensed ester will be listed in Table below, without limiting the present invention.

155810, JP-A-H05-197073, JP-A-2006-259494, JP-A-H07-330670, JP-A-2006-342227, and JP-A-2007-003679 are usable.

(Carbohydrate Derivative-Based Plasticizer)

It is preferable for the cellulose acylate film of the present invention to further contain a carbohydrate derivative-based plasticizer. With the carbohydrate derivative-based plasticizer contained therein, the cellulose ester film thus obtained

TABLE 1

| | Dicarboxylic acid | | | Diol | | | |
|---|---|---|---|---|---|---|---|
| | Aromatic dicarboxylic acid | Aliphatic dicarboxylic acid | Dicarboxylic acid, molar ratio | Diol 1 | Diol 2 | Diol ratio (mol %) | Terminal |
| J-1 | TPA | SA | 45/55 | ethanediol | propanediol | 45/55 | acetyl ester group |
| J-2 | TPA | SA | 50/50 | ethanediol | propanediol | 45/55 | acetyl ester group |
| J-3 | TPA | SA | 55/45 | ethanediol | propanediol | 45/55 | acetyl ester group |
| J-4 | TPA | SA | 65/35 | ethanediol | propanediol | 45/55 | acetyl ester group |
| J-5 | TPA | SA | 55/45 | ethanediol | propanediol | 25/75 | acetyl ester group |
| J-6 | TPA | SA | 55/45 | ethanediol | propanediol | 10/90 | acetyl ester group |
| J-7 | 2,6-NPA | SA | 50/50 | ethanediol | propanediol | 45/55 | acetyl ester group |
| J-8 | 2,6-NPA | SA | 50/50 | ethanediol | propanediol | 45/55 | acetyl ester group |
| J-9 | TPA/PA | SA | 45/5/50 | ethanediol | propanediol | 45/55 | acetyl ester group |
| J-10 | TPA/PA | SA | 40/10/50 | ethanediol | propanediol | 45/55 | acetyl ester group |
| J-11 | TPA | SA/AA | 50/30/20 | ethanediol | propanediol | 45/55 | acetyl ester group |
| J-12 | TPA | SA/AA | 50/20/30 | ethanediol | propanediol | 45/55 | acetyl ester group |
| J-13 | TPA | SA | 50/50 | ethanediol | propanediol | 25/75 | acetyl ester group |
| J-14 | TPA | SA | 55/45 | ethanediol | propanediol | 45/55 | acetyl ester group |
| J-15 | TPA | SA | 55/45 | ethanediol | cyclohexanedimethanol | 45/55 | acetyl ester group |
| J-16 | TPA | SA | 45/55 | ethanediol | propanediol | 45/55 | hydroxyl group |
| J-17 | TPA | SA | 50/50 | ethanediol | propanediol | 45/55 | hydroxyl group |
| J-18 | TPA | SA | 55/45 | ethanediol | propanediol | 45/55 | hydroxyl group |
| J-19 | TPA | SA | 65/35 | ethanediol | propanediol | 45/55 | hydroxyl group |
| J-20 | TPA | SA | 55/45 | ethanediol | propanediol | 25/75 | hydroxyl group |
| J-21 | TPA | SA | 55/45 | ethanediol | propanediol | 10/90 | hydroxyl group |
| J-22 | 2,6-NPA | SA | 50/50 | ethanediol | propanediol | 25/75 | hydroxyl group |
| J-23 | 2,6-NPA | SA | 50/50 | ethanediol | propanediol | 25/75 | hydroxyl group |
| J-24 | 2,6-NPA | SA | 45/5/50 | ethanediol | propanediol | 25/75 | hydroxyl group |
| J-25 | 2,6-NPA | SA | 40/10/50 | ethanediol | propanediol | 25/75 | hydroxyl group |
| J-26 | TPA | SA/AA | 50/30/20 | ethanediol | propanediol | 25/75 | hydroxyl group |
| J-27 | TPA | SA/AA | 50/20/30 | ethanediol | propanediol | 25/75 | hydroxyl group |
| J-28 | TPA | SA | 50/50 | ethanediol | propanediol | 25/75 | hydroxyl group |
| J-29 | TPA | SA | 55/45 | ethanediol | propanediol | 25/75 | hydroxyl group |
| J-30 | TPA | SA | 55/45 | ethanediol | cyclohexanedimethanol | 25/75 | hydroxyl group |
| J-31 | TPA | SA | 55/45 | ethanediol | propanediol | 45/55 | propionyl ester group |
| J-32 | TPA | — | 100/0 | ethanediol | propanediol | 50/50 | hydroxyl group |
| J-33 | TPA | — | 100/0 | ethanediol | propanediol | 40/60 | acetyl ester group |
| J-34 | TPA | SA | 50/50 | ethanediol | propanediol | 45/55 | benzoyl ester group |
| J-35 | TPA | SA | 55/45 | ethanediol | propanediol | 50/50 | hydroxyl group |
| J-36 | TPA | SA | 55/45 | ethanediol | propanediol | 50/50 | acetyl ester group |
| J-37 | TPA | SA | 80/20 | ethanediol | propanediol | 50/50 | hydroxyl group |
| J-38 | TPA | SA | 80/20 | ethanediol | propanediol | 50/50 | acetyl ester group |
| J-39 | PA | AA | 10/90 | ethanediol | none | 100/0 | acetyl ester group |
| J-40 | PA | AA | 25/75 | ethanediol | none | 100/0 | acetyl ester group |
| J-41 | PA | AA | 50/50 | ethanediol | none | 100/0 | acetyl ester group |

Abbreviations used in Table above respectively represent the compounds below. PA: phthalic acid, TPA: terephthalic acid, AA: adipic acid, SA: succinic acid, 2,6-NPA: 2,6-naphthalene dicarboxylic acid.

The polycondensed ester may readily be synthesized by any of general methods which include heat melt condensation of diol and dicarboxylic acid, based on a polyester-forming reaction or ester exchange reaction, or an interfacial condensation of acid chlorides of these acids and glycols.

The polycondensed ester is detailed in "Kaso-zai, Sono Riron to Oyo (Plasticizer, the Theory and Applications)" edited by Koichi MURAL, (published by Saiwai Shobo, 1st edition, 1st impression, published on Mar. 1, 1973). Also materials described in JP-A-H05-155809, JP-A-H05- will have a good stability against humidity and will give the polarizing plate with good durability.

The carbohydrate derivative-based plasticizer is preferably a monosaccharide, or derivative of carbohydrate containing 2 to 10 monosaccharide units.

The monosaccharide or polysaccharide which preferably configures the carbohydrate derivative-based plasticizer is characterized in that any substitutable groups in the molecule (hydroxyl group, carboxyl group, amino group, and mercapto group, etc.) are substituted. Structures obtained as a results of substitution include alkyl group, aryl group, and acyl group. Also exemplified are ether structure formed by substitution, ester structure formed by substitution of hydroxyl group with acyl group, and amino structure or imide structure formed by substitution with amino group.

Examples of the monosaccharide, or carbohydrate containing 2 to 10 monosaccharide unit are exemplified by erythrose, threose, ribose, arabinose, xylose, lyxose, allose, altrose, glucose, fructose, mannose, gulose, idose, galactose, talose, trehalose, isotrehalose, neotrehalose, trehalosamine, kojibiose, nigerose, maltose, maltitol, isomaltose, sophorose, laminaribiose, cellobiose, gentiobiose, lactose, lactosamine, lactitol, lactulose, melibiose, primeverose, rutinose, scillabiose, sucrose, sucralose, turanose, bicyanose, cellotriose, chacotriose, gentianose, isomaltotriose, isopanose, maltotriose, manninotriose, melezitose, panose, planteose, raffinose, solatriose, umbelliferose, lycotetraose, maltotetraose, stachyose, maltopentaose, verbascose, maltohexaose, α-cyclodextrin, β-cyclodextrin, γ-cyclodextrin, δ-cyclodextrin, xylitol, and sorbitol.

More preferably exemplified are ribose, arabinose, xylose, lyxose, glucose, fructose, mannose, galactose, trehalose, maltose, cellobiase, lactose, sucrose, sucralose, α-cyclodextrin, β-cyclodextrin, γ-cyclodextrin, δ-cyclodextrin, xylitol, and sorbitol, furthermore preferably exemplified are arabinose, xylose, glucose, fructose, mannose, galactose, maltose, cellobiose, sucrose, β-cyclodextrin, and γ-cyclodextrin, and particularly exemplified are xylose, glucose, fructose, mannose, galactose, maltose, cellobiose, sucrose, xylitol, and sorbitol.

The substituent of the carbohydrate derivative-based plasticizer is exemplified by alkyl group (preferably $C_{1-22}$, more preferably $C_{1-12}$, and particularly $C_{1-8}$ alkyl group, for example, methyl group, ethyl group, propyl group, hydroxyethyl group, hydroxypropyl group, 2-cyano ethyl group, and benzyl group); aryl group (preferably $C_{6-24}$, more preferably $C_{6-18}$, particularly $C_{6-12}$ aryl group, for example, phenyl group, and naphthyl group); and acyl group (preferably $C_{1-22}$, more preferably $C_{2-12}$, particularly $C_{2-8}$ acyl group, for example, acetyl group, propionyl group, butyryl group, pentanoyl group, hexanoyl group, octanoyl group, benzoyl group, tolyl group, phthalyl group, and naphthyl group, etc.). Preferable structures substituted by amino group are exemplified by amide structure (preferably $C_{1-22}$, more preferably $C_{2-12}$, particularly $C_{2-8}$ amide, for example, formamide and acetamide); and imide structure (preferably $C_{4-22}$, more preferably $C_{4-12}$, particularly $C_{4-8}$ imide, for example, succinimide and phthalimide).

Among them, alkyl group, aryl group and acyl group are more preferable, and acyl group is particularly preferable.

Preferable examples of the carbohydrate derivative-based plasticizer are exemplified as follows. However, the carbohydrate derivative-based plasticizer, usable in the present invention is not limited thereto. Preferable examples include xylose tetraacetate, glucose pentaacetate, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabutyrate, glucose pentabutyrate, fructose pentabutyrate, mannose pentabutyrate, galactose pentabutyrate, maltose octabutyrate, cellobiose octabutyrate, sucrose octabutyrate, xylitol pentabutyrate, sorbitol hexabutyrate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitolpentabenzoate, and sorbitol hexabenzoate. More preferable examples include xylose tetraacetate, glucose pentaacetate, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate. Particularly preferable examples include maltose octaacetate, cellobiose octaacetate, sucrose octaacetate, xylose tetrapropionate, glucose pentapropionate, fructose pentapropionate, mannose pentapropionate, galactose pentapropionate, maltose octapropionate, cellobiose octapropionate, sucrose octapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate.

The carbohydrate derivative-based plasticizer preferably has a pyranose structure or furanose structure.

The compound shown below is particularly preferable as the carbohydrate derivative usable in the present invention. The carbohydrate derivative usable in the present invention is, however, not limited to the compound. Note that, in the structural formula below, each R independently represents an arbitrary substituent, wherein the plurality of (R)s are same or different.

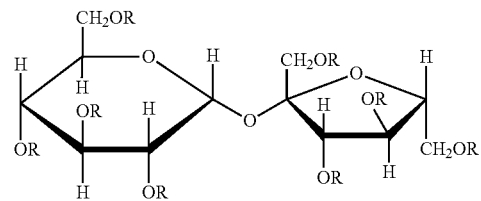

TABLE 2

| | Substituent 1 | | Substituent 2 | | |
|---|---|---|---|---|---|
| Compound | Species | Degree of substitution | Species | Degree of substitution | Molecular weight |
| K-101 | acetyl | 7 | benzyl | 1 | 727 |
| K-102 | acetyl | 6 | benzyl | 2 | 775 |
| K-103 | acetyl | 7 | Benzoyl | 1 | 741 |
| K-104 | acetyl | 6 | Benzoyl | 2 | 802 |
| K-105 | benzyl | 2 | None | 0 | 523 |
| K-106 | benzyl | 3 | None | 0 | 613 |
| K-107 | benzyl | 4 | None | 0 | 702 |
| K-108 | acetyl | 7 | phenyl acetyl | 1 | 771 |
| K-109 | acetyl | 6 | phenyl acetyl | 2 | 847 |
| K-110 | benzoyl | 1 | None | 0 | 446 |
| K-111 | benzoyl | 2 | None | 0 | 551 |
| K-112 | benzoyl | 3 | None | 0 | 655 |
| K-113 | benzoyl | 4 | None | 0 | 759 |
| K-114 | benzoyl | 5 | None | 0 | 863 |
| K-115 | benzoyl | 6 | None | 0 | 967 |
| K-116 | benzoyl | 7 | None | 0 | 1071 |
| K-117 | benzoyl | 8 | None | 0 | 1175 |

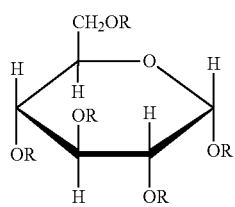

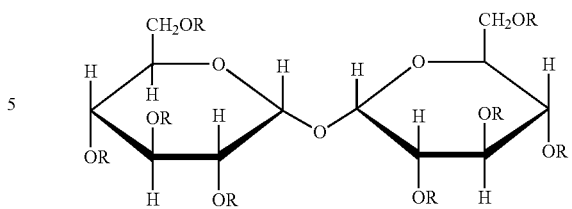

TABLE 3

| | Substituent 1 | | Substituent 2 | | |
|---|---|---|---|---|---|
| Compound | Species | Degree of substitution | Species | Degree of substitution | Molecular weight |
| K-201 | acetyl | 4 | Benzoyl | 1 | 468 |
| K-202 | acetyl | 3 | Benzoyl | 2 | 514 |
| K-203 | acetyl | 2 | Benzoyl | 3 | 577 |
| K-204 | acetyl | 4 | benzyl | 1 | 454 |
| K-205 | acetyl | 3 | benzyl | 2 | 489 |
| K-206 | acetyl | 2 | benzyl | 3 | 535 |
| K-207 | acetyl | 4 | phenyl acetyl | 1 | 466 |
| K-208 | acetyl | 3 | phenyl acetyl | 2 | 543 |
| K-209 | acetyl | 2 | phenyl acetyl | 3 | 619 |
| K-210 | phenyl acetyl | 1 | None | 0 | 298 |
| K-211 | phenyl acetyl | 2 | None | 0 | 416 |
| K-212 | phenyl acetyl | 3 | None | 0 | 535 |
| K-213 | phenyl acetyl | 4 | None | 0 | 654 |
| K-214 | acetyl | 1 | Benzoyl | 4 | 639 |
| K-215 | acetyl | 0 | Benzoyl | 5 | 701 |

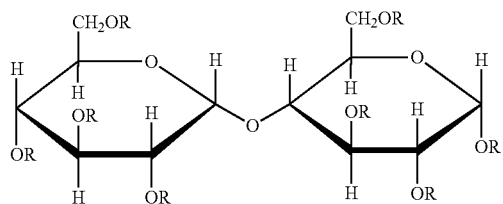

TABLE 4

| | Substituent 1 | | Substituent 2 | | |
|---|---|---|---|---|---|
| Compound | Species | Degree of substitution | Species | Degree of substitution | Molecular weight |
| K-301 | acetyl | 6 | benzoyl | 2 | 803 |
| K-302 | acetyl | 6 | benzyl | 2 | 775 |
| K-303 | acetyl | 6 | phenyl acetyl | 2 | 831 |
| K-304 | benzoyl | 2 | none | 0 | 551 |
| K-305 | benzyl | 2 | none | 0 | 522 |
| K-306 | phenyl acetyl | 2 | none | 0 | 579 |

TABLE 5

| | Substituent 1 | | Substituent 2 | | |
|---|---|---|---|---|---|
| Compound | Species | Degree of substitution | Species | Degree of substitution | Molecular weight |
| K-401 | acetyl | 6 | Benzoyl | 2 | 803 |
| K-402 | acetyl | 6 | benzyl | 2 | 775 |
| K-403 | acetyl | 6 | phenyl acetyl | 2 | 831 |
| K-404 | benzoyl | 2 | None | 0 | 551 |
| K-405 | benzyl | 2 | None | 0 | 523 |
| K-406 | phenyl ester | 2 | None | 0 | 579 |

(Availability)

The carbohydrate derivative is commercially available from Tokyo Chemical Industry Co., Ltd., Aldrich and so forth, or may be synthesized from commercially available carbohydrates by a known ester derivatization method (for example, a method described in JP-A-H08-245678).

The carbohydrate derivative-based plasticizer is commercially available from Tokyo Chemical Industry Co., Ltd., Aldrich and so forth, or may be synthesized from commercially available carbohydrated by a known ester derivatization method (for example, a method described in JP-A-H08-245678).

The amount of addition of these plasticizers is preferably 1 to 20% by mass relative to the cellulose acylate. If the amount is 1% by mass or more, the effect of improving the durability of polarizer will be more accessible, and if the amount is 20% by mass or less, also the breeding-out will be less likely to occur. The amount of addition is more preferably 2 to 15% by mass, and particularly 5 to 15% by mass.

Time of addition of these plasticizers to the cellulose acylate film is not specifically limited, so long as it is added by the time of film formation. For example, these plasticizers may be added during synthesis of the cellulose acylate, or may be mixed with the cellulose acylate during preparation of the dope.

(Antioxidant)

In the present invention, the cellulose acylate solution may be added with any of publicly known antioxidants, for example, phenolic or hydroquinone-based antioxidant such as 2,6-di-tert-butyl-4-methyl phenol, 4,4'-thiobis(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone, and pentaerythrityl-tetrakis[3-(3,5-di-tert-butyl-4-hydroxyphenyl)propionate]. It is further preferable to add phosphorus-containing antioxidant such as tris(4-methoxy -3,5-diphenyl) phosphite, tris(nonylphenyl) phosphite, tris(2,4-di-tert-butylphenyl) phosphite, bis(2,6-di-tert-butyl-4-methylphenyl)pentaerythritol diphosphite, and bis(2,4-di-tert-butylphenyl)pentaerythritol diphosphite. The amount of addition of the antioxidant is preferably 0.05 to 5.0 parts by mass per 100 parts by mass of the cellulosic resin.

(UV Absorber)

In the present invention, the cellulose acylate solution may be added with an UV absorber, from the viewpoint of preventing deterioration of the polarizing plate, liquid crystal or the like. The UV absorber preferably used herein are those having good UV absorptivity in the wavelength range of 370 nm or less, and also from the viewpoint of good display performance on the liquid crystal display, showing less absorption of visible light in the wavelength range of 400 nm or more. Specific examples of the UV absorber preferably used in the present invention include hindered phenol-based compound, hydroxybenzophenone-based compound, benzotriazole-based compound, salycilate-based compound, benzophenone-based compound, cyano acrylate-based compound, and nickel complex salt-based compound. The hindered phenolic compound is exemplified by 2,6-di-tert-butyl-p-cresol, pentaerythrityl-tetrakis[3-(3,5-di-tert-butyl-4-hydroxyphenyl) propionate], N,N'-hexamethylenebis(3,5-di-tert-butyl-4-hydroxy-hydroxy cinnamide), 1,3,5-trimethyl-2,4,6-tris(3,5-di-tert-butyl-4-hydroxybenzyl)benzene, and tris-(3,5-di-tert-butyl-4-hydroxybenzyl) isocyanurate. The benzotriazole-based compound is exemplified by 2-(2'-hydroxy-5'-methylphenyl)benzotriazole, 2,2-methylenebis(4-(1,1,3,3-tetramethylbutyl)-6-(2H-benzo triazole-2-yl)phenol], (2,4-bis-(n-octylthio)-6-(4-hydroxy-3, 5-di-tert-butylanilino)-1,3,5-triazine, triethylene glycol-bis [3-(3-tert-butyl-5-methyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, 2-(2'-hydroxy-3',5'-di-tert-amylphenyl)-5-chlorobenzotriazole, 2,6-di-tert-butyl-p-cresol, and pentaerythrityl-tetrakis[3-(3,5-di-tert-butyl-4-hydroxyphenyl) propionate]. The amount of addition of the UV blocker is preferably 1 ppm to 1.0% on the weight basis in the whole optical film, and more preferably 10 to 1,000 ppm.

(Matting Agent)

The cellulose acylate film may be added with a matting agent, from the viewpoint of film slippage and safety in the manufacturing. The matting agent may be an inorganic compound or an organic compound.

Preferable examples of the inorganic compound composing the matting agent include silicon-containing inorganic compounds (for example, silicon dioxide, calcined calcium silicate, hydrated calcium silicate, aluminum silicate, magnesium silicate), titanium oxide, zinc oxide, aluminum oxide, barium oxide, zirconium oxide, strontium oxide, antimony oxide, tin oxide, tin/antimony oxide, calcium carbonate, talc, clay, calcined kaolin, and calcium phosphate. The silicon-containing inorganic compound and zirconium oxide are more preferably used, wherein it is particularly preferable to use silicon dioxide since it can reduce the turbidity of the cellulose acylate film. Silicon dioxide particles are commercially available typically under the trade names of Aerosil R972, R974, R812, 200, 300, R202, OX50 and TT600 (all from Nippon Aerosil Co., Ltd.). Zirconium oxide particles are commercially available typically under the trade names of Aerosil 8976 and 8811 (all from Nippon Aerosil Co., Ltd.).

Preferable examples of the organic compound composing the matting agent include polymers such as silicone resin, fluorine-containing resin and acrylic resin. Among them, silicone resin is preferably used. Among the silicone resins, those having a three-dimensional network structure are preferably used, which are commercially available typically under the trade names of Tospearl 103, Tospearl 105, Tospearl 108, Tospearl 120, Tospearl 145, Tospearl 3120 and Tospearl 240 (all from Toshiba Silicone Co., Ltd.).

The matting agent may be added to the cellulose acylate solution by an arbitrary method not specifically limited, so long as a desired cellulose acylate solution may be obtained. For example, the additive may be added in the process of mixing the cellulose acylate and the solvent, or may be added after the cellulose acylate and solvent were mixed to produce a mixed solution. Still alternatively, the additive may be added and mixed immediately before the dope is cast, by a so-called, just-in-time addition process, using an on-line screw kneader provided for the mixing. More specifically, a static mixer such as inline mixer is preferably used, wherein the inline mixer is preferably, for example, a static mixer SWJ (Toray static inline mixer, "Hi-Mixer") (from Toray Engineering Co., Ltd.). As for the inline addition, JP-A-2003-053752 describes a method of manufacturing a cellulose acylate film directed to avoid non-uniformity in density and coagulation of matting particles, in which distance L between the end of a nozzle through which an addition solution with a different composition is added to a main dope, and the base end of the inline mixer, is set to not more than 5 times the inner diameter of a pipe for feeding a main ingredient. The description also deals with a more preferable embodiment in which the distance L between the open end of a feeding nozzle through which an addition solution with a different composition is added to a main dope, and the base end of the inline mixer, is set to not more than 10 times the inner diameter (d) of the open end of the feeding nozzle, wherein the inline mixer is a static non-agitated inline mixer or dynamic agitated inline mixer. More specifically, it is disclosed that the ratio of flow rate given by (main dope of cellulose acylate film)/(inline addition liquid) is 10/1 to 500/1, and preferably 50/1 to 200/1. Also JP-A-2003-014933, which is directed to a retardation film which is low in bleed-out of additives, free from inter-layer separation, good in slippage and translucency, describes a method of adding additives, stating that the additive may be added into a melting pot, an additive or a solution having the additive dissolved or dispersed therein may be added on the way from the melting pot to a co-casting die into the dope being fed, wherein in the latter case, a mixing unit such as static mixer is preferably provided for an improved mixing performance.

In the cellulose acylate film, the matting agent will not increase the haze of the film if added not so much, and is less likely to cause nonconformities such as lowered contrast or occurrence of bright spot when actually incorporated into LCD. Meanwhile, if the amount of addition is not too small, squeaking may be suppressed and scratch resistance may be ensured. From these points of view, the amount of addition is preferably 0.05 to 1.0% by mass.

1-4. Configuration and Physical Properties of Cellulose Acylate Film (Layer Configuration of Film)

The cellulose acylate film may be single-layered, or may be a laminate of two or more layers.

The cellulose acylate film, when configured as a laminate of two or more layers, is preferably two-layered or three-layered, and more preferably three-layered. When configured as a three-layered film and manufactured by solution casting, the film of the present invention preferably has a layer brought into contact with the metal support (referred to as support-contacting layer, or skin layer B, hereinafter), a layer directed to the interface with the air on the opposite side of the metal support (referred to as air-contacting layer, or skin layer A, hereafter) and a single core layer held in between (referred to as base layer, hereinafter). In short, the film of the present invention preferably has a three-layered structure given by (skin layer B)/(core layer)/(skin layer A).

The skin layer A and the skin layer B are generally referred to as skin layer (or surficial layer).

In the cellulose acylate film, the degree of acyl substitution in the individual layers may be same, or a plurality of cellulose acylates may be contained in a single layer, wherein it is preferable that the degree of acyl substitution of the cellulose acylate is kept constant in all of the individual layers, from the viewpoint of controlling the optical characteristics. When the cellulose acylate film has the three-layered structure, the cellulose acylate contained in the surficial layers on both sides preferably has the same degree of acyl substitution, from the viewpoint of manufacturing cost.

(Elastic Modulus)

The film of the present invention has an elastic modulus which is sufficient for practical use. While not specifically limited, the elastic modulus ranges from 1.0 GPa to 5.0 GPa from the viewpoint of adaptability to manufacturing and readiness of handling, and more preferably 2.0 GPa to 4.5 GPa. The compound represented by formula (1), when added into the cellulose acylate, acts to make the film hydrophobic to thereby improve the elastic modulus, which is recognized as another advantage of the present invention.

(Photoelastic Coefficient)

The film of the present invention preferably has an absolute value of the photoelastic coefficient of $8.0 \times 10^{-12}$ $m^2/N$ or smaller, more preferably $6 \times 10^{-12}$ $m^2/N$ or smaller, and furthermore preferably $5 \times 10^{-12}$ $m^2/N$ or smaller. By reducing the photoelastic coefficient of the resin film, the resin film, when incorporated as the polarizing plate protective films into the liquid crystal display device, will suppress non-uniformity in display screen under high temperatures and high humidity. The photoelastic coefficient is measured and calculated by the method described below, unless otherwise specifically noted. While not specifically limited, the lower limit value of the photoelastic coefficient is practically $0.1 \times 10^{-12}$ $m^2/N$ or larger.

The film is cut into pieces of 3.5 cm×12 cm in size, Re values under the individual load values of 0 g, 250 g, 500 g, 1,000 g and 1,500 g were measured using an ellipsometer (M150, from JASCO Corporation), and photoelastic coefficient was determined based on the slope of a straight line representing a relation between stress and Re.

(Moisture Content)

Moisture content of the resin film may be evaluated by measuring equilibrium moisture content at constant temperature and constant humidity. The specimens were allowed to stand at constant temperature and constant humidity for 24 hours, the moisture content of the specimens which reached the equilibrium state was measured by the Karl Fischer process, and equilibrium moisture content was calculated by dividing the water content (g) by the mass of specimen (g).

The film of the present invention preferably has a moisture content at 25° C., 80% relative humidity of 5% by mass or smaller, more preferably 4% by mass or smaller, and furthermore preferably less than 3% by mass. By reducing the moisture content of the film, the resin film, when incorporated as the polarizing plate protective films into the liquid crystal display device, will suppress non-uniformity in display screen under high temperatures and high humidity. While not specifically limited, the lower limit value of the moisture content is practically 0.1% by mass or larger.

(Moisture Permeability)

Moisture permeability of the resin film may be evaluated in compliance with JIS Z0208 "Testing Methods for Determination of the Water Vapor Transmission Rate (Dish Method)", in an environment at 60° C. and 95% RH, by measuring the weight of water vapor which transmits through an 1-$m^2$ sample over 24 hours.

The resin film of the present invention preferably has a moisture permeability of 500 to 2,000 g/m·day, more preferably 900 to 1,300 g/m·day, and particularly 1,000 to 1,200 g/m·day.

(Haze)

The cellulose acylate film preferably has a haze of 1% or smaller, more preferably 0.7% or smaller, and particularly 0.5% or smaller. By adjusting the haze to the upper limit values or lower, the film will successfully be improved in the translucency and will be made more readily usable as an optical film. Unless otherwise specifically noted, the haze is measured and calculated according to the method used in Examples which will be described later. While not specifically limited, the lower limit value of the haze is practically 0.001% or above.

(Film Thickness)

The cellulose acylate film preferably has an average thickness of 30 to 100 μm, more preferably 30 to 80 μm, and furthermore preferably 30 to 70 μm. With the thickness adjusted to 30 μm or above, the film will be handled more readily and successfully, when manufactured into a web. With the thickness adjusted to 70 μm or below, the film will be durable against changes in moisture, and will be ready to keep the optical characteristics.

For the case where the cellulose acylate film has a layered structure composed of three or more layers, the core layer is preferably 30 to 70 μm thick, and more preferably 30 to 60 μm. thick. In the film of the present invention, when configured to have a layered structure composed of three of more layers, each of surficial layers on both sides of the film (skin layer A and skin layer B) is preferably 0.5 to 20 μm thick, more preferably 0.5 to 10 μm thick, and particularly 0.5 to 3 μm thick.

(Film Width)

The cellulose acylate film preferably has a width of 700 to 3,000 mm, more preferably 1,000 to 2,800 mm, and particularly 1,300 to 2,500 mm.

1-5. Method of Manufacturing Cellulose Acylate Film

The cellulose acylate film is preferably manufactured by the solvent cast process. Exemplary manufacture of the cellulose acylate film based on the solvent cast process may be referred to the individual specifications of U.S. Pat. No. 2,336,310, ibid. U.S. Pat. No. 2,367,603, ibid. U.S. Pat. No. 2,492,078, ibid. U.S. Pat. No. 2,492,977, ibid. U.S. Pat. No. 2,492,978, ibid. U.S. Pat. No. 2,607,704, ibid. U.S. Pat. No. 2,739,069 and ibid. U.S. Pat. No. 2,739,070, the individual specifications of British Pat. Nos. 640731 and 736892, and gazettes of JP-B-S45-4554, JP-B-S49-5614, JP-A-S60-176834, JP-A-S60-203430 and JP-A-S62-115035. The cellulose acylate film may be stretched. Methods and conditions of stretching may be referred, for example, to the individual gazettes of JP-A-S62-115035, JP-A-H04-152125, JP-A-H04-284211, JP-A-H04-298310, and JP-A-H11-48271.

(Methods of Casting)

Known methods of casting the solution includes a method of uniformly extruding the prepared dope through a pressurized die onto a metal support, a doctor-blade method by which the dope is once cast on a metal support, and the thickness of which is then adjusted using a blade, and a method using a reverse roll coater so as to make adjustment with the aid of a reversely rotating roll. The method of using a pressurized die is preferable. The pressurized die includes those of coat hanger type and T-die type, both of them are preferably used. Besides the methods exemplified above, the casting may be conducted by any of various known methods of casting the cellulose triacetate solution, by which effects similar to those described in the individual gazettes may be obtained, by setting the individual conditions taking, for example, a variety in boiling point of the solvents to be used into consideration.

Co-Casting

The cellulose acylate film is preferably formed by laminate casting such as co-casting, sequential casting or coating. In particular, simultaneous co-casting is preferably used, from the viewpoint of stability of manufacturing and saving of production cost.

Manufacturing based on co-casting or sequential casting begins with preparation of the cellulose acetate solutions (dopes) for the individual layers. In the co-casting (multi-layered simultaneous casting), the dopes for forming the individual layers (which may be three layers or more) are simultaneously extruded through a casting T-die which extrudes the dopes typically through separate slits onto a casting support (band or drum) so as to form the individual layers at the same time, the laminate is separated from the support at an appropriate time, and then dried to obtain the film. FIG. 3 is a cross-sectional view illustrating a process of casting using a co-casting T-die 3, configured to simultaneously extrude a skin layer-forming dope 1 and a core layer-forming dope 2, so as to form three layers on a casting support 4.

The sequential casting is a method by which, first, a casting dope for forming a first layer is extruded for casting through a casting T-die onto the casting support, dried or not dried, a casting dope for forming a second layer is extruded through the casing T-die, further sequentially casing and laminating, if necessary, the dope for forming a third layer and layers thereafter, the laminate is separated at an appropriate time from the support, dried, and shaped. The coating is a method by which, in general, a film for composing the core layer is formed by solution casting, a coating liquid to be coated on the surface is prepared, the coating liquid is coated using an appropriate coating apparatus sequentially on each side, or simultaneously on both sides of the film, and then dried to obtain a film with a layered structure.

An endless loop metal support used for forming the cellulose acylate film is a drum having a mirror-finished surface with chromium plating, or a stainless steel belt (also referred to as band) mirror-finished by surface polishing. A single unit, or two or more units of pressurized die used herein may be installed over the metal support. A single unit or two units are preferably used. When two or more units are installed, the dope to be cast may be divided for the individual units assigned with a variety of fractions, or the dope may be fed to the dies using a plurality of precision metering gear pumps assigned with respective fractions. Temperature of the dope (resin solution) is preferably −10 to 55° C., and more preferably 25 to 50° C. In this case, the solution temperature may be same over the entire process, or may vary from site to site in the process. When the temperature varies, it suffices that a desired temperature is attained immediately before the casting.

While not specifically limited, material for composing the metal support is more preferably SUS (for example, SUS 316)

(Separation)

The method of manufacturing the cellulose acylate film preferably includes a process of separating the dope film from the metal support. Methods of separation in the method of the manufacturing the cellulose acylate film is not specifically limited. Any of publicly known method will successfully improve the separability.

(Stretching)

The method of manufacturing the cellulose acylate film preferably includes a process of stretching the cast film. The cellulose acylate film may be stretched in either direction of machine direction and the direction orthogonal to the machine direction (transverse direction), wherein the direction orthogonal to the machine direction (transverse direction) is preferable, from the viewpoint of a succeeding process of manufacturing of the polarizing plate using the film.

Methods of transverse stretching are described, for example, in JP-A-S62-115035, JP-A-H04-152125, JP-A-H04-284211, JP-A-H04-298310, and JP-A-H11-48271. In the longitudinal stretching, the film may be stretched typically by controlling the speed of film feeding rollers so as to set the taking-up speed faster than the unrolling speed. In the transverse stretching, the film may be stretched by feeding it while being held by a tenter, and by gradually expanding the width of the tenter. The film may alternatively be stretched using a stretching machine after the film is dried (preferably by uniaxial stretching using a long stretching machine).

When the cellulose acylate film is intended to be used as the protective film for the polarizer, for the purpose of suppressing leakage of light when viewed diagonally, it is necessary to align the transmission axis of the polarizer and the in-plane slow axis of the resin film of the present invention in parallel with each other. Since the transmission axis of the polarizer, as manufactured continuously in the form of rolled film, generally lies in parallel with the width-wise direction of the rolled film, so that, in order to continuously bond the polarizer in the form of rolled film, with the protective film composed of the cellulose acylate film again in the form of rolled film, it is necessary for the protective film in the form of rolled film to have the in-plane slow axis laid in parallel with the width-wise direction of the film. Accordingly, the film is preferably stretched more largely in the width-wise direction. The film may be stretched in the middle way of the film-forming process, or may be stretched after being formed and taken up in the form of web.

The factor of transverse stretching is preferably 5 to 100%, more preferably 5 to 80%, and particularly 5 to 40%. The film may be stretched in the middle way of the film-forming process, or may be stretched after being formed and taken up in the form of web. In the former case, the film may be stretched while keeping therein residual solvent, and is preferably when the amount of residual solvent, given by (Amount of residual solvent)=[(Mass of residual volatile)/(Mass of annealed film)]×100%, falls in the range from 0.05 to 50%. It is particularly preferable to stretch the film with a content of residual solvent of 0.05 to 5%, by a factor of 5 to 80%.

(Drying)

The method of manufacturing a cellulose acylate film preferably includes a step of drying the cellulose acylate film, and a step of stretching the dried resin film of the present invention at a temperature of Tg-10° C. or above, from the viewpoint of good development of retardation.

In the manufacture of the cellulose acylate film, the dope on the metal support may be dried generally by a method of blowing hot air from the top surface side of the metal support (drum or belt), in other words, on the surface of the web on the metal support; a method of blowing hot air from the back surface of the drum or belt; and a back surface fluid heat conduction system in which a temperature-controlled fluid is brought into contact with the back surface, that is, the surface opposite to the surface having the dope cast thereon, of the belt or drum, so as to heat the drum or belt by heat conduction, to thereby control the surface temperature. The back surface fluid heat conduction system is preferable. The surface temperature of the metal support before casting is not specifically limited provided it is not higher than the boiling point of the solvent used in the dope. It is, however preferable to set the temperature 1 to 10° C. lower than the boiling point of a solvent having the lowest boiling point among from the solvents being used, in view of accelerating the drying, and of defluidizing the dope on the metal support. This shall not apply for the case where the cast dope is separated after cooling, but without drying.

The thickness of the film may be adjusted to a desired value, by controlling concentration of solid components contained in the dope, slit gap of base of the die, pressure of extrusion from the die, and feed speed of the metal support.

Length of the thus-obtained cellulose acylate film to be taken up is preferably 100 to 10,000 m per roll, more preferably 500 to 7,000 m, and furthermore preferably 1,000 to 6,000 m. In the process of taking-up, the film is preferably knurled at least on one end, preferably with a width of knurling of 3 mm to 50 mm, and more preferably 5 mm to 30 mm, and preferably with a height of knurling of 0.5 to 500 μm, and more preferably 1 to 200 μm. The knurling may be given by single action or double action.

The cellulose acylate film is particularly suitable for large-screen liquid crystal display devices, since the large-screen display devices generally suffer from degraded contrast and emphasized hue changes in diagonal directions. When intended to be used as an optical compensation film of large-screen liquid crystal display devices, the cellulose acylate film is preferably formed to have a width of, for example, 1,470 mm or wider. The polarizing plate protective film in the present invention includes not only a product form obtained by cutting into size suitable for direct incorporation into the liquid crystal display devices, but also a product form of rolled film obtained by continuous production of a long web and the succeeding taking-up. The polarizing plate protective film of the latter case is stored and transported in this product form, and cut into a desired size when it is actually incorporated into the liquid crystal display devices, or bonded to the polarizer and so forth. Alternatively, the polarizing plate protect film is bonded, while keeping its web form, with the polarizer and so forth, which is typically composed of polyvinyl alcohol film again in the form of web, and cut into a desired size when they are actually incorporated into the liquid crystal display devices. An exemplary product form of rolled optical compensation film is a roll with a length of 2,500 m or longer.

2. Polarizing Plate

The present invention also relates to a polarizing plate which has at least a polarizer, and the cellulose acylate film of the present invention.

The polarizing plate of the present invention preferably has a polarizer, and the film of the present invention bonded to one surface, or to both surfaces of the polarizer. The polarizer include iodine-containing polarizer, dye-containing polarizer using a dichroic dye, and polyene-based polarizer. The iodine-containing polarizer and the dye-containing polarizer are generally manufactured using a polyvinyl alcohol-based film. When the cellulose acylate film of the present invention is used as the polarizing plate protective film, the polarizing plate may be manufactured by any of general methods without special limitation. In one known method, the obtained cellulose acylate film is treated with an alkali, and then bonded to both surfaces of the polarizer, having been manufactured by immersing a polyvinyl alcohol film into an iodine solution and then stretched, using aqueous solution of a fully saponified polyvinyl alcohol. In place of the alkali treatment, the film may be subjected to easy adhesion treatment such as described in JP-A-H06-94915 and JP-A-H06-118232. The adhesive used for bonding the treated surface of the protective film and the polarizer is exemplified by polyvinyl alcohol-based adhesive such as polyvinyl alcohol and polyvinyl butyral, and vinyl-based latex such as butyl acrylate.

When the cellulose acylate film of the present invention is bonded to the polarizer, it is preferable to align the transmission axis of the polarizer substantially in parallel with the slow axis of the cellulose acylate film of the present invention. In the liquid crystal display device of the present invention, the transmission axis of the polarizing plate and the slow axis of the cellulose acylate film of the present invention are preferably aligned substantially in parallel. "Substantially in parallel" herein means that the direction of the principal refractive index nx of the cellulose acylate film of the present invention falls within a range of deviation of 5° away from the direction of the transmission axis of the polarizing plate, wherein the deviation more preferably falls within an 1° range, and more preferably within a 0.5° range. If the deviation is larger than 1°, the polarizing plates in the crossed Nicol arrangement will unfortunately be degraded in the polarization performance, to cause leakage of light.

The polarizing plate of the present invention includes not only a product form obtained by cutting into size suitable for direct incorporation into the liquid crystal display device, but also a product form of rolled film obtained by continuously producing a long web and then taking it up (for example, a roll of 2,500 m long or longer, and a roll of 3,900 m long or longer). When intended to be used in large-screen liquid crystal display devices, the polarizing plate is preferably formed to have a width of 1,470 mm or wider. Configuration of the polarizing plate of the present invention is arbitrarily selectable from those publicly known, without special limitations. For example, a configuration illustrated in FIG. 6 of JP-A-2008-262161 is adoptable.

3. Liquid Crystal Display Device

The present invention also relates to a liquid crystal display device which has a liquid crystal cell, and the polarizing plate of the present invention.

Figure 2:
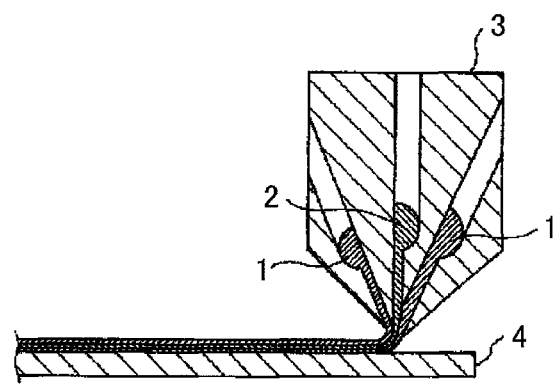
FIG. 2 A schematic diagram illustrating an exemplary process of casting of a three-layered cellulose acylate film by simultaneous co-casting using a simultaneous co-casting die.

The liquid crystal display device of the present invention has a liquid crystal cell, and a pair of polarizing plates disposed on both sides of the liquid crystal cell, and is preferably IPS, OCB, or VA-mode liquid crystal display device in which at least one of the polarizing plates is configured by the polarizing plate of the present invention. A typical internal configuration of the liquid crystal display device was illustrated in FIG. 2. Specific configuration of the liquid crystal display device of the present invention is arbitrarily selectable from those publicly known, without special limitations. Also a configuration illustrated in FIG. 2 of JP-A-2008-262161 is preferably used.

EXAMPLE

The present invention will further be detailed below referring to Examples. It should, however, be understood that the present invention is not construed as being limited thereto.

Exemplary Synthesis 1

Into a 300-ml glass flask equipped with a thermometer, a reflux condenser and a stirrer, 47 g (0.5 mol) of phenol, and 5.9 g of activated clay (K-500, from Nihon Kassei Hakudo Co., Ltd.) as a catalyst were put. The content of the flask was heated to 85° C., and 104 g (1.0 mol) of styrene was added over 6 hours under stirring. Upon completion of the addition, the content was further aged for 0.5 hours. Upon completion of the reaction, the content was cooled, filtered to remove the catalyst, and washed with water to obtain 150 g of a reaction product (C-01) (yield=99.3%).

Exemplary Synthesis 2-4

Compounds (C-02) to (C-04) were obtained in the same way as described in Exemplary Synthesis 1, except that the amount addition of styrene was respectively changed to 156 g (1.5 mol), 52 g (0.5 mol) and 260 g (2.5 mol).

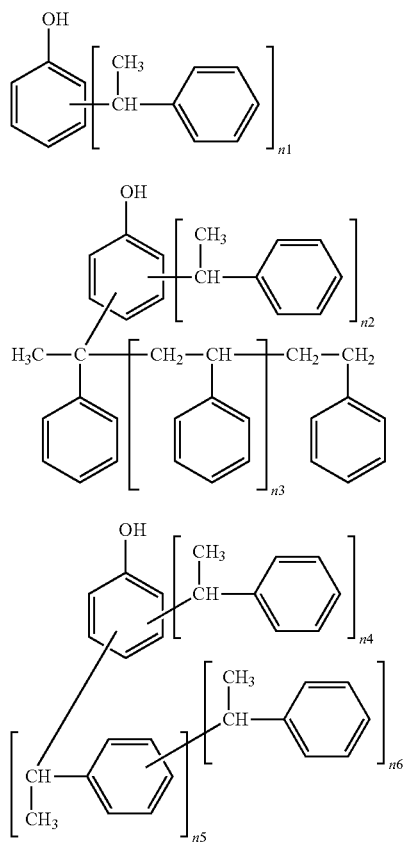

The compound (C-01) is a mixture given by $n1=1$ to 3 in the formula (4), the compound (C-02) is a mixture given by $n1=2$ or 3 in the formula (4), the compound (C-03) is a mixture given by $n1=1$ or 2 in the formula (4), and the compound (C-04) is a mixture given by $n1=2$ or 3 in the formula (4), $n2=1$ or 2, and $n3=0$ to 2 in the formula (5), and $n4=2$, $n5=1$ and $n6=1$ in the formula (6).

Exemplary Synthesis 5-7

Compounds (C-05) to (C-07) were obtained in the same way as described in Exemplary Synthesis 1, except that 2,6-dimethylphenol, cresol, and resorcinol were respectively used in place of phenol.

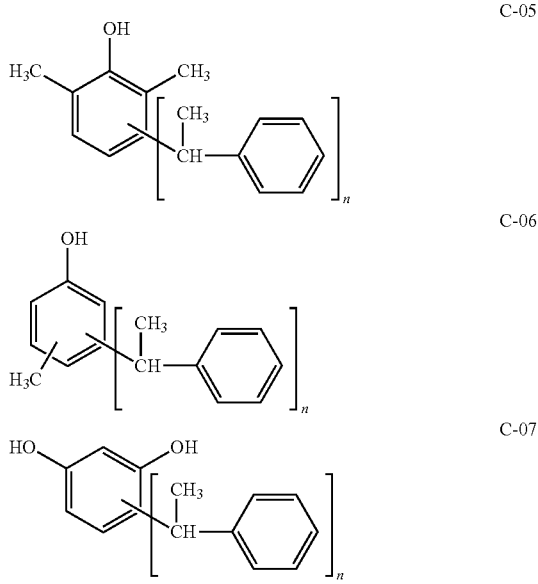

All of the compounds (C-05) to (C-07) are mixtures given by $n=1$ to 3.

Comparative Synthesis 1

Exemplary Compound (P-c1) was obtained in accordance with a method of synthesis described in paragraph [0187] of JP-A-2003-12859.

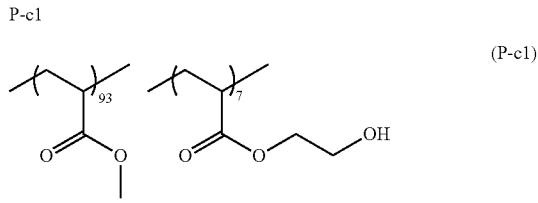

Example 1 and Comparative Example 1

(1) Formation of Cellulose Acylate Film
<Preparation of Cellulose Acylate>
Cellulose acylate with a degree of acetyl substitution of 2.87 was prepared, by adding sulfuric acid (7.8 parts by mass per 100 parts by mass of cellulose) as a catalyst, and a carboxylic acid as a source for the acyl substituent, and allowing the acylation reaction to proceed at 40° C. The acylation was followed by aging at 40° C. Low molecular weight components in the obtained cellulose acylate were removed by washing with acetone.

<Preparation of Skin Layer-Forming Dope>
(Preparation of Cellulose Acylate Solution)

The composition below was put in a mixing tank, and stirred to dissolve the individual components, to thereby prepare a cellulose acylate solution.

| Composition of Cellulose Acylate Solution | |
|---|---|
| Cellulose acetate, degree of acetyl substitution = 2.87, degree of substitution = 370 | 100.0 parts by mass |
| Monopet SB (registered trademark), from Dai-ichi Kogyo Seiyaku Co., Ltd., (plasticizer 1)[*1] | 9.0 parts by mass |
| SAIB-100, from Eastman Chemical Company (plasticizer 2)[*2] | 3.0 parts by mass |
| Methylene chloride (first solvent) | 353.9 parts by mass |
| Methanol (second solvent) | 89.6 parts by mass |
| n-Butanol (third solvent) | 4.5 parts by mass |

[*1]plasticizer 1: sucrose benzoate
[*2]plasticizer 2: sucrose acetate isobutyrate (Preparation of Matting Agent Solution)

The composition below was put in a disperser, and stirred to dissolve the individual components, to thereby prepare a matting agent solution.

| Composition of Matting Agent Solution | |
|---|---|
| Silica particle, average particle size = 20 nm (Aerosil R972, from Nippon Aerosil Co., Ltd.) | 2.0 parts by mass |
| Methylene chloride (first solvent) | 69.3 parts by mass |
| Methanol (second solvent) | 17.5 parts by mass |
| n-Butanol (third solvent) | 0.9 parts by mass |
| Cellulose acylate solution obtained above | 0.9 parts by mass |

(Preparation of UV Absorber Solution)

The composition below was put in a mixing tank, and stirred under heating to dissolve the individual components, to thereby prepare a UV absorber solution 3.

| Preparation of UV Absorber Solution | |
|---|---|
| UV absorber C shown below | 20.0 parts by mass |
| Methylene chloride (first solvent) | 61.0 parts by mass |
| Methanol (second solvent) | 15.4 parts by mass |
| n-Butanol (third solvent) | 0.8 parts by mass |
| Cellulose acylate solution obtained above | 12.8 parts by mass |

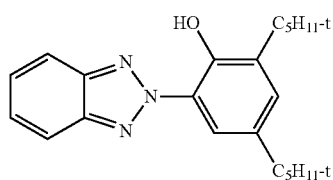

UV absorber C

After being respectively filtered, 1.3 parts by mass of the obtained matting agent solution and 3.4 parts by mass of the UV absorber solution were mixed using an in-line mixer, the mixture was further added with 95.3 parts by mass of cellulose acylate solution, and the mixture was mixed using an in-line mixer, to thereby prepare a skin layer-forming solution.

<Preparation of Base Layer-Forming Dope>
(Preparation of Cellulose Acylate Solution)

The composition below was put in a mixing tank, and stirred to dissolve the individual components, to thereby prepare a base-forming dope.

| | |
|---|---|
| Cellulose acetate, degree of acetyl substitution = 2.87, degree of substitution = 370 | 100.0 parts by mass |
| Monopet SB (registered trademark), from Dai-ichi Kogyo Seiyaku Co., Ltd., (plasticizer 1)[*1] | 9.0 parts by mass |
| SAIB-100, from Eastman Chemical Company (plasticizer 2)[*2] | 3.0 parts by mass |
| (C-01) | 4.0 parts by mass |
| UV Absorber C shown above | 2.0 parts by mass |
| Methylene chloride (first solvent) | 297.7 parts by mass |
| Methanol (second solvent) | 75.4 parts by mass |
| n-Butanol (third solvent) | 3.8 parts by mass |

[*1]plasticizer 1: sucrose benzoate
[*2]plasticizer 2: sucrose acetate isobutyrate <Casting>

Using a drum casting apparatus, the thus prepared dope (base layer-forming dope) and the skin layer-forming dope positioned on both sides thereof were uniformly cast through a casting port on a stainless steel casting support (kept at support temperature-9° C.) so as to implement three-layer simultaneous casting. The laminate, while retaining approximately 70% by mass of residual solvent in the dopes composing the individual layers, was separated, fixed at both ends in the width-wise direction thereof using a pin tenter, stretched 1.28 times in the transverse direction while retaining the residual solvent content of 3 to 5% by mass, and concurrently dried. The laminate was further dried while being allowed to pass through rolls of an annealing apparatus, to thereby obtain a cellulose acylate film 101 of Example. The thus obtained cellulose acylate film 101 was found to be 60 μm thick, and 1480 mm wide.

Cellulose acylate films of Examples 102 to 113 and Comparative Examples C11 to C13 were manufactured in the same way as the film 101, except that the species and/or amount of use of the compounds were altered as listed in Table 1, rather than using (C-01). Cellulose acylate films of Examples 114 to 117, and Comparative Example C14 were manufactured as described below. Results of evaluation of the individual items, made on the individual films, are listed in Table 1.

Cellulose acylate film of Example 114 was manufactured in the same way as the film 109, except that 10.0 parts by mass of polycondensed ester-based plasticizer (J-39) (number-average molecular weight=1000) was used in place of using the plasticizers 1 and 2.

Cellulose acylate films of Examples 115 to 117 and Comparative Example C14 were manufactured in the same way as the film 114, except that the species and/or amount of use of the compounds were altered as listed in Table 1, in place of using TSP. Results of evaluation of the individual items, made on the individual films, are listed in Table 1.

Example 2 and Comparative Example 2

(2) Manufacture of Polarizing Plate
[Saponification of Polarizing Plate Protective Film]

The thus manufactured polarizing plate protective film of Example 1 was immersed in a 2.3 mol/L aqueous sodium hydroxide solution at 55° C. for 3 minutes, washed in a water washing bath at room temperature, and then neutralized at 30° C. using a 0.05 mol/L sulfuric acid. The polarizing plate protective film was again washed in a water washing bath at room temperature, and dried under hot air at 100° C. The surface of the polarizing plate protective film of Example 1 was thus saponified. The polarizer used herein is a general one described in the foregoing paragraphs titled "Polarizing Plate".

[Manufacture of Polarizing Plate]

A polarizer was manufactured by allowing the stretched polyvinyl alcohol film to adsorb iodine.

The saponified polarizing plate protective film 101 of Example 1 was bonded to one surface of the polarizer using a polyvinyl alcohol-based adhesive. A commercially available cellulose triacetate film (Fujitac TD80UF, from FUJI-FILM Corporation) was saponified in the same way, and bonded to the surface of the polarizer, which is opposite to the surface having already bonded with the polarizing plate protective film manufactured in Example 1, using a polyvinyl alcohol-based adhesive.

The polarizer and the polarizing plate protective film manufactured in Example 1 were arranged so as to align the transmission axis of the former orthogonal to the slow axis of the latter. Also the polarizer and the commercially available cellulose triacetate film were arranged so as to align the transmission axis of the former orthogonal to the slow axis of the latter.

A polarizing plate 201 of Example was manufactured in this way.

Also the polarizing plate protective films configured by the films 102 to 117, and the polarizing plate protective films configured by the films C11 to C14 in Comparative Examples were respectively saponified and used to manufacture the polarizing plates in the same way.

Polarizing plates 202 to 217, and C21 to C24 of Examples and Comparative Examples were manufactured in this way.

[Evaluation]

(Measurement of Moisture Permeability)

Mass of water vapor which transmits over 24 hours in an atmosphere of temperature of 40° C. and relative humidity of 90% RH was measured in accordance with the moisture permeability test (cup method) of JIS Z0208, and the measured value was converted to the value per 1-m² of the sample.

A: moisture permeability is less than 1,200 g/m·day;
B: moisture permeability is 1,200 to 1,300 g/m·day; and
C: moisture permeability is more than 1,300 g/m·day.

(Evaluation of Durability of Polarizing Plate)

Durability test of polarizing plate were conducted as described below, using a polarizing plate bonded to a glass plate using an adhesive. Two samples (ca. 5 cm×5 cm) were prepared by respectively bonding the polarizing plate to a glass plate in such a way that the cellulose acylate film of the present invention is placed on the air interface side. In the measurement of single-plate orthogonal transmittance, the sample was set so as to face the cellulose acylate film side of the present invention of this sample film to the light source. Two samples were independently measured, and the average value was employed as the orthogonal transmittance of the polarizing plate of the present invention. Orthogonal transmittance of the polarizing plates was measured using an automated polarizing film measurement device VAP-7070 (from JASCO Corporation) in the wavelength range from 380 nm to 780 nm, and a value at 410 nm was employed. Thereafter, the orthogonal transmittance of the samples kept in an environment at 80° C., 90% relative humidity, for 168 hours, and 336 hours, were measured in the same way. Changes in the orthogonal transmittance before and after the elapse of time were determined, based on which the durability of the polarizing plate was determined, and the results were recorded. Relative humidity in environments without humidity control was found to fall in the range from 0% to 20%.

A: less than 0.6%;
B: 0.6 to 1.0%; and
C: more than 1.0%.

(Measurement of Rate of Reduction in Boric Acid Content in Polarizer)<

<Quantification of Boric Acid Content in Polarizer before Elapse of Time>

The polarizing plate was punched into a 1 cm×1 cm piece, added with 3 cc of nitric acid, and ashed by microwave at a maximum temperature of 230° C. The ash was added with water to adjust the total weight to 50 g, and the boron content was measured using ICP-OES (Optima 7300DV) from PerkinElmer.

<Quantification of Boric Acid Content after Kept at 80° C., 90%, for 336 Hours>

The polarizing plate protective film was separated from the polarizing plate after the elapse of time, and only the polarizer was taken out. The polarizer was treated in the same way with that before the elapse of time, and the boron content in the polarizer was quantified.

Rate of reduction in boric acid content (%) before and after the elapse of time at 80° C., 90% relative humidity for 336 hours was calculated using the formula below:

{1−(Boron content after elapse of time)/(Boron content before elapse of time)}×100

A: less than 50%;
B: 50 to 60%; and
C: more than 60%.

(Measurement of Haze)

Haze of the film specimens of 40 mm×80 mm in size was measured in an environment at 25° C. and 60% relative humidity, using a haze meter (HGM-2DP, from Suga Test Instruments Co., Ltd.), in compliance with JIS K-7136.

A: haze is 1% or smaller;
B: haze is larger than 1% and 5% or smaller;
C: haze is larger than 5%.

TABLE 6

| | | Compound | | Evaluation | | | | |
|---|---|---|---|---|---|---|---|---|
| No. | Species | Weight-average molecular weight | Amount of addition in base layera) | Rate of reduction in boric acid content | Change in cross tranmittance | Moisture permeability | Haze | Remark |
| 101 | C-01 | 360 | 4 | A | A | A | A | Invention |
| 102 | C-02 | 400 | 4 | A | A | A | A | Invention |
| 103 | C-03 | 290 | 4 | A | A | A | A | Invention |
| 104 | C-01 | 360 | 2 | A | A | A | A | Invention |

TABLE 6-continued

| | Compound | | | Evaluation | | | | |
|---|---|---|---|---|---|---|---|---|
| No. | Species | Weight-average molecular weight | Amount of addition in base layer a) | Rate of reduction in boric acid content | Change in cross tranmittance | Moisture permeability | Haze | Remark |
| 105 | C-02 | 400 | 8 | A | A | A | A | Invention |
| 106 | C-04 | 520 | 1 | A | A | A | A | Invention |
| 107 | SP b) | 260 | 8 | A | A | A | A | Invention |
| 108 | SP-23 b) | 340 | 2 | A | A | A | A | Invention |
| 109 | TSP b) | 420 | 4 | A | A | A | A | Invention |
| 110 | PH-25 c) | 390 | 2 | A | A | A | A | Invention |
| 111 | C-05 | 380 | 8 | A | A | A | A | Invention |
| 112 | C-06 | 350 | 40 | A | A | A | B | Invention |
| 113 | C-07 | 390 | 0.05 | B | B | B | A | Invention |
| 114 | TSP b) | 420 | 4 | A | A | A | A | Invention |
| 115 | C-01 | 360 | 4 | A | A | A | A | Invention |
| 116 | C-01 | 360 | 2 | A | A | A | A | Invention |
| 117 | PH-25 c) | 390 | 2 | A | A | A | A | Invention |
| c11 | P-c1 | 5000 | 4 | C | C | B | C | Comparative Example |
| c12 | Araldite EPN1179 d) | 405 | 4 | C | C | C | C | Comparative Example |
| c13 | none | — | — | C | C | C | A | Comparative Example |
| c14 | none | — | — | C | C | C | A | Comparative Example | a) parts by mass per 100 parts by mass of cellulose acylate
b) product name of styrenated phenol from Sanko Co., Ltd.
c) product name of styrenated phenol from Nitto Chemical Co., Ltd.
d) product name of epoxy resin from Asahi Kasei Corporation In Table above, "Araldite EPN1179" used for Comparative Example C12 is an additive used for Exemplary Film Sample No. 7 described in JP-A-2003-183417, having a structure below.
Araldite EPN1179

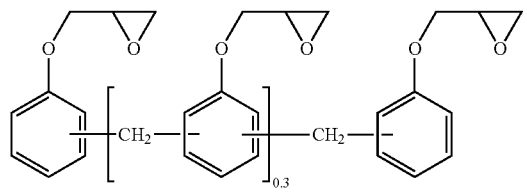

Molecular weight: ca.405

In Table, "SP" in Examples 107 to 110 is a mixture given by n1=1 to 2 in the formula (4). "SP-23" is a mixture given by n1=2 to 3 in the formula (4). "PH-25" is a mixture given by n1=1 to 3 in the formula (4). "TSP" is a mixture given by n1=2 to 3, n2=1 to 2, and n3=0 to 1 in the formulae (4) and (5).

It was found from the results listed in Table 1, that the films of the present invention (Examples) containing the compounds represented by the formula (1) have low moisture permeability, capable of effectively suppressing degradation of the polarizer with time, and have good haze values.

The film C11 of Comparative Example, composed of an acrylic resin, was found to fail in achieving a satisfactory level of hydrophobicity, supposedly because lack of aromatic rings. The Film C12 is composed of an epoxy group-containing phenol resin, but has no hydroxyl group, so that it showed only a limited affinity to the cellulose acylate film, and was inferior to the compound represented by the formula (1) both in terms of hydrophobicity and compatibility.

Accordingly, the film was found to have poor levels of the rate of reduction in boric acid content, changes in orthogonal transmittance, and haze value. The film C13 of Comparative Example, which represents a case where cellulose acylate was added with no additive, was found to be inferior to the films of the present invention in terms of the rate of reduction in boric acid content, changes in orthogonal transmittance, and moisture permeability.

Example 3 and Comparative Example 3

[Manufacture of Liquid Crystal Display Device]

A polarizing plate on the viewer's side of a commercially available liquid crystal television set (Bravia J5000 from SONY Corporation) was peeled off, and the polarizing plate 201 of the present invention, having the polarizing plate protective film 101 of Example 1 incorporated therein, was bonded via an adhesive so as to direct the polarizing plate protective film of Example to the liquid crystal cell (the film 31b in FIG. 1). The transmission axis of the polarizing plate on the viewer's side was aligned vertically. The configuration is as schematically illustrated in FIG. 1, wherein the liquid crystal display device manufactured herein has, from the lower to the upper in the drawing, alight source 26, alight guide plate 25, a first polarizing plate 21A (a polarizer 32, polarizing films 31a, 31b), an array substrate 24 having an alignment film and a translucent electrode, a liquid crystal layer 23, a color filter substrate 22 having an alignment film and a translucent electrode, and a polarizing plate 21B. As described above, the protective film 31b of the second polarizing plate 21B is configured by the films of Examples and Comparative Examples replaced from the original. In this configuration, the protective film and the polarizing plate were arranged so as to match the stretching direction of the former and the direction of polarization R of the latter.

Liquid crystal display devices 302 to 317, and C31 to C34 of the individual Examples and Comparative Examples were manufactured in the same way, except that the protective film and the polarizing plate, the protective films and the polarizing plates of other Examples, and the polarizing plate protective films and the polarizing plates of other Comparative Examples, were respectively used.

EXPLANATION OF SYMBOLS

1 skin layer-forming dope
2 core layer-forming dope
3 co-casting T-die
4 casting support
21A, 21B polarizing plate
22 color filter substrate
23 liquid crystal layer
24 array substrate
25 light guide plate
31a, 31b cellulose acylate film (protective film)
32 light guide plate

The invention claimed is:

1. A cellulose acylate film comprising at least a cellulose acylate and a compound represented by the formula (1) below, the film containing the compound 0.3 to 60 parts by mass per 100 parts by mass of the cellulose acylate:

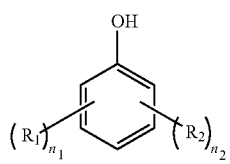
(1)

in the formula (1), $R_1$ represents a hydrogen atom or substituent, $R_2$ represents a substituent represented by the formula (2") below;

$n_1$ represents an integer of 0 to 4, when $n_1$ is 2 or larger, the plurality of $(R_1)$s may be the same with or different from each other; $n_2$ represents an integer of 1 to 5, when $n_2$ is 2 or larger, the plurality of $(R_2)$s may be the same with or different from each other;

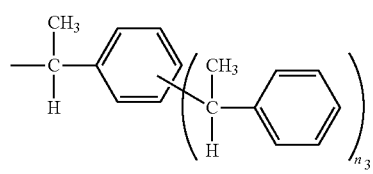
(2")

in the formula (2"), $n_3$ represents an integer of 0 to 5, wherein the compound represented by formula (1) is a mixture of at least two species of compounds represented by formula (1), each of the species being structurally different from one another.

2. The cellulose acylate film of claim 1, wherein $R_1$ in the formula (1) represents a hydrogen atom or $C_{1-8}$ alkyl group, $R_2$ is represented by the formula (2"), $n_1$ represents an integer of 2 to 4, $n_2$ represents an integer of 1 to 3, and n3 represents an integer of 0 to 2.

3. The cellulose acylate film of claim 1, wherein the compound represented by the formula (1) has a weight-average molecular weight of 200 to 1,200.

4. The cellulose acylate film of claim 1, wherein the cellulose acylate satisfies the degree of acyl substitution given by the relational expression below:

1.5≤A≤3.0 wherein A represents the degree of acyl substitution.

5. The cellulose acylate film of claim 1, wherein the cellulose acylate satisfies the degree of acetyl substitution given by the relational expression below:

2.0≤B≤3.0 wherein B represents the degree of acetyl substitution.

6. The cellulose acylate film of claim 1, further comprising at least one species of polycondensed ester-based plasticizer.

7. The cellulose acylate film of claim 6, wherein the polycondensed ester-based plasticizer is obtained by polycondensation of at least one species of dicarboxylic acid represented by the formula (4) below, and at least one species of diol represented by the formula (5) below:

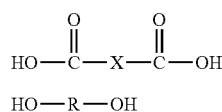

in the formula (4), X represents a $C_{2-18}$ aliphatic group or aromatic group; in the formula (5), R represents a $C_{2-8}$ aliphatic group, the aliphatic group may be straight-chain, branched, or cyclic.

8. The cellulose acylate film of claim 6, wherein the polycondensed ester-based plasticizer has a number-average molecular weight of 500 to 2,000.

9. The cellulose acylate film of claim 6, wherein the terminals of the polycondensed ester-based plasticizer are blocked.

10. The cellulose acylate film of claim 1, further comprising at least one species of carbohydrate derivative-based plasticizer composed of monosaccharide or 2 to 10 monosaccharide units.

11. The cellulose acylate film of claim 10, wherein the carbohydrate derivative-based plasticizer is substituted by alkyl group, aryl group or acyl group.

12. The cellulose acylate film of claim 10, wherein the carbohydrate derivative-based plasticizer is substituted by acyl group.

13. A polarizing plate comprising at least a polarizer, and the cellulose acylate film of claim 1.

14. A liquid crystal display device comprising at least a liquid crystal cell and the polirizing plate of claim 13.

* * * * *